(12) United States Patent
Moser et al.

(10) Patent No.: US 9,193,440 B2
(45) Date of Patent: Nov. 24, 2015

(54) VARIABLE CAMBER FLAP SYSTEM AND METHOD

(71) Applicant: The Boeing Company, Chicago, IL (US)

(72) Inventors: Matthew A. Moser, Marysville, WA (US); Michael R. Finn, Kirkland, WA (US); Mark J. Gardner, Snohomish, WA (US); Mark S. Good, Seattle, WA (US); Sarah A. Jones, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 192 days.

(21) Appl. No.: 14/034,940

(22) Filed: Sep. 24, 2013

(65) Prior Publication Data

US 2015/0083852 A1 Mar. 26, 2015

(51) Int. Cl.
*B64C 3/50* (2006.01)
*B64C 13/34* (2006.01)
*B64C 9/14* (2006.01)
*B64C 13/26* (2006.01)

(52) U.S. Cl.
CPC . *B64C 13/34* (2013.01); *B64C 3/50* (2013.01); *B64C 9/14* (2013.01); *B64C 13/26* (2013.01)

(58) Field of Classification Search
USPC ........................................ 244/99.2, 99.3, 99.4
See application file for complete search history.

(56) References Cited

U.S. PATENT DOCUMENTS

| | | | |
|---|---|---|---|
| 2,350,751 A * | 6/1944 | Gliubich | 318/446 |
| 3,822,047 A | 7/1974 | Schuldt, Jr. | |
| 4,106,730 A | 8/1978 | Spitzer et al. | |
| 4,725,026 A | 2/1988 | Krafka et al. | |
| 4,729,528 A | 3/1988 | Borzachillo | |
| 4,821,981 A | 4/1989 | Gangsaas et al. | |
| 4,838,503 A | 6/1989 | Williams | |
| 5,056,741 A | 10/1991 | Bliesner | |
| 5,839,699 A | 11/1998 | Bliesner | |
| 6,152,405 A * | 11/2000 | Muller | 244/219 |
| 7,494,094 B2 | 2/2009 | Good et al. | |

(Continued)

FOREIGN PATENT DOCUMENTS

| | | |
|---|---|---|
| EP | 0193442 | 9/1986 |
| EP | 1547917 A1 | 6/2005 |

(Continued)

OTHER PUBLICATIONS

Airbus, "Getting to Grips with Aircraft Performance," Jan. 2002.
Delta Virtual Airlines, "Boeing 777-200ER Aircraft Operating Manual," Nov. 2005.
The Boeing Company, "777 Flight Crew Operations Manual," Dec. 15, 2003.

(Continued)

*Primary Examiner* — Justin Benedik

(57) ABSTRACT

A variable camber system for an aircraft may include a variable camber trim unit (VCTU) positioned between an inboard device and an outboard device. The inboard device and the outboard device may be mounted to at least one of a leading edge and a trailing edge of a wing. The VCTU may include a speed sum gearbox having an inboard shaft coupled to the inboard device and an outboard shaft coupled to the outboard device. The VCTU may additionally include a VCTU electric motor engaged to the speed sum gearbox. The VCTU electric motor may be selectively operable in conjunction with the speed sum gearbox to rotate the outboard shaft independent of the inboard shaft in a manner causing the outboard device to be actuated independent of the inboard device.

15 Claims, 18 Drawing Sheets

(56) References Cited

U.S. PATENT DOCUMENTS

| | | | |
|---|---|---|---|
| 7,641,152 B2 * | 1/2010 | Onu et al. | 244/194 |
| 7,726,610 B2 | 6/2010 | Good et al. | |
| 8,356,766 B2 | 1/2013 | Garthaffner | |
| 8,424,810 B1 | 4/2013 | Shmilovich et al. | |
| 2005/0011994 A1 | 1/2005 | Sakurai et al. | |
| 2005/0151028 A1 * | 7/2005 | Pohl et al. | 244/213 |
| 2006/0049308 A1 * | 3/2006 | Good et al. | 244/76 A |
| 2010/0200704 A1 * | 8/2010 | Berens et al. | 244/76 A |
| 2011/0127385 A1 | 6/2011 | Morris | |
| 2012/0032030 A1 * | 2/2012 | Ruckes et al. | 244/215 |

FOREIGN PATENT DOCUMENTS

| | | | |
|---|---|---|---|
| EP | 2465770 | * 6/2012 | B64C 9/20 |
| EP | 2465770 A2 | 6/2012 | |
| FR | 2902756 | 12/2007 | |
| GB | 2186849 | 8/1987 | |
| WO | WO9915403 A1 | 4/1999 | |

OTHER PUBLICATIONS

European Search Report for EP14185998.3, dated Feb. 13, 2015.

* cited by examiner

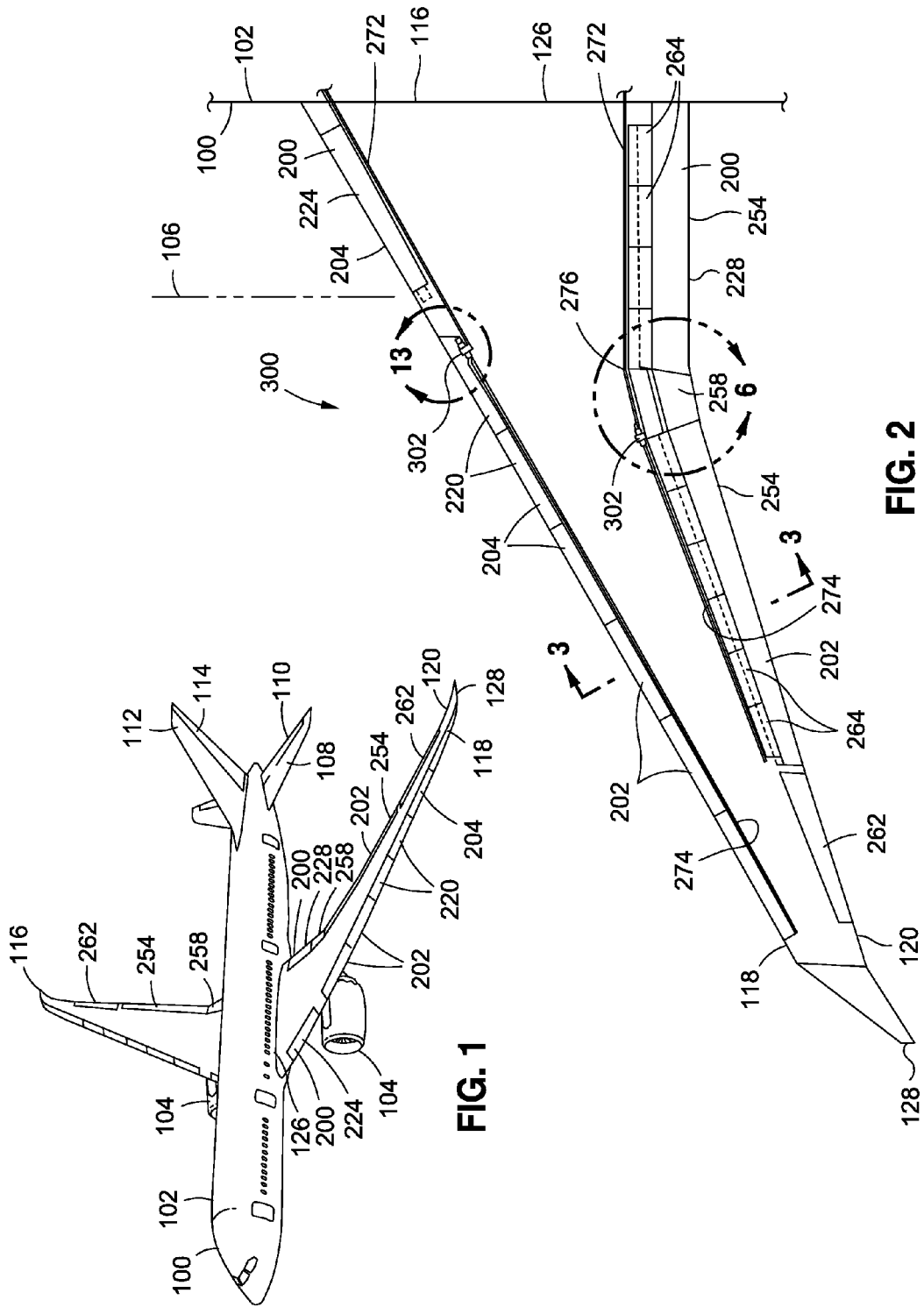

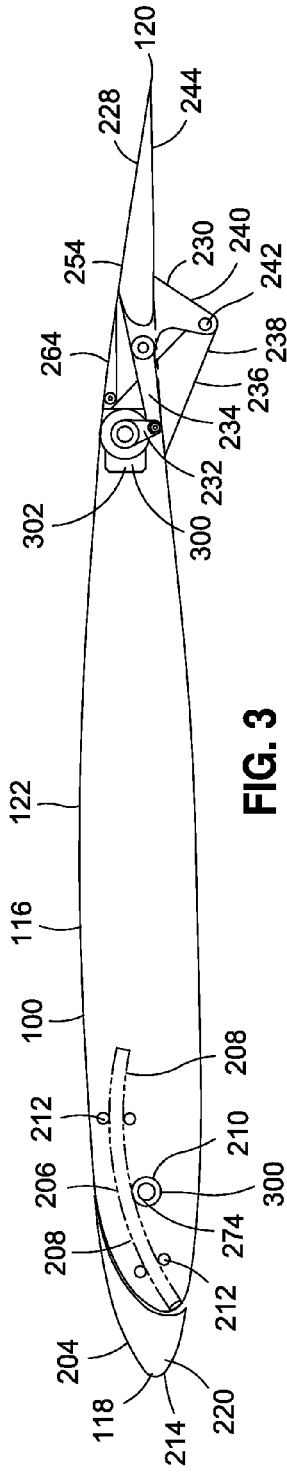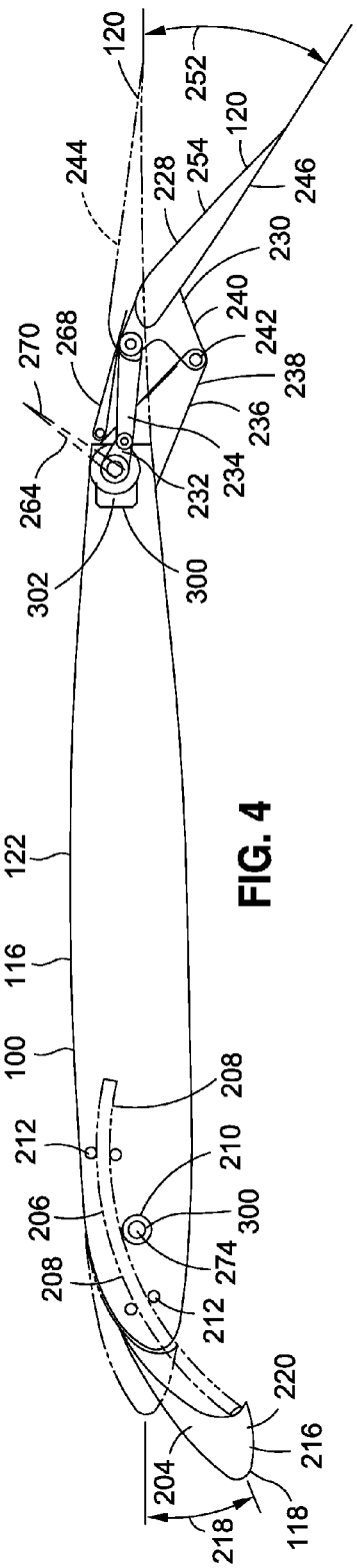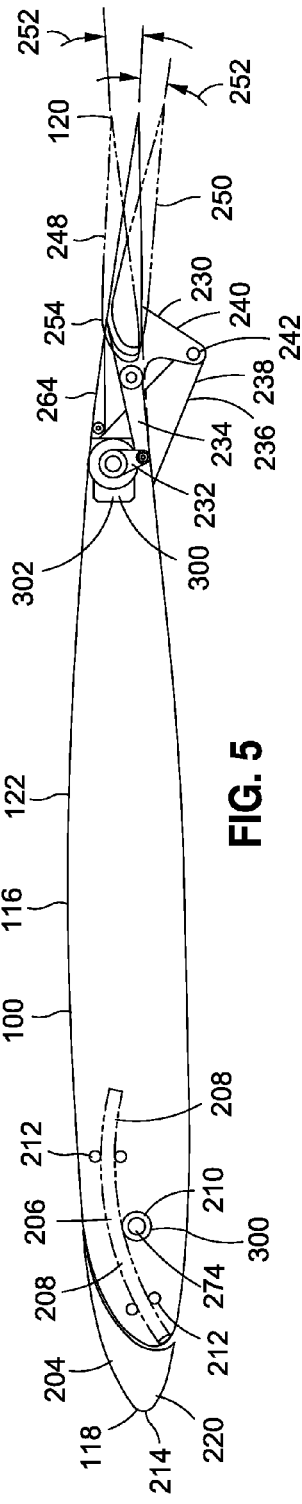

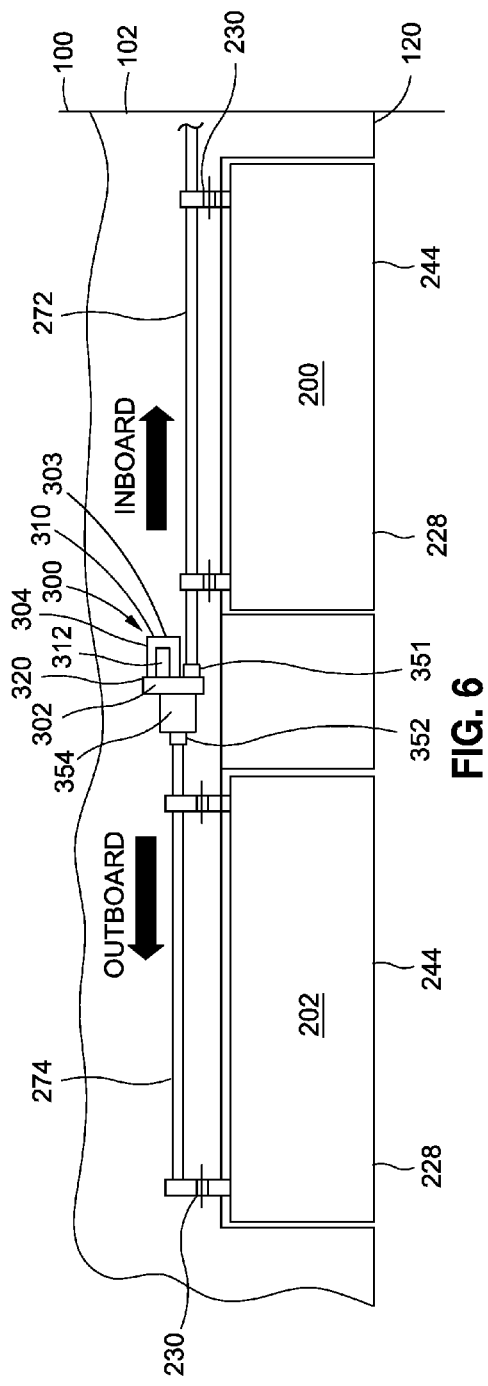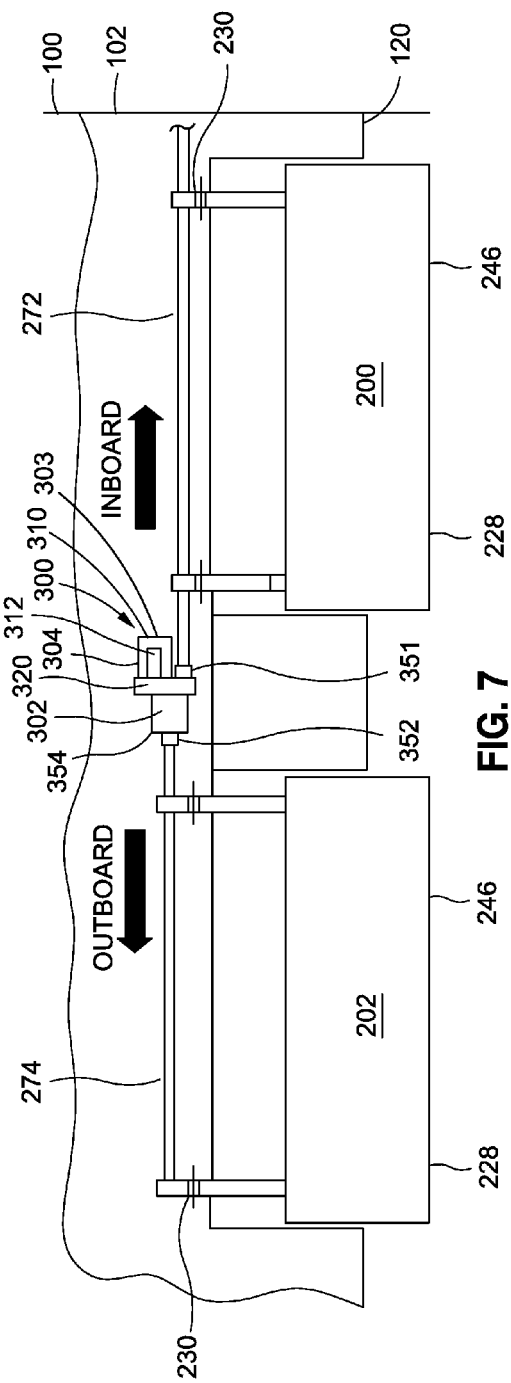

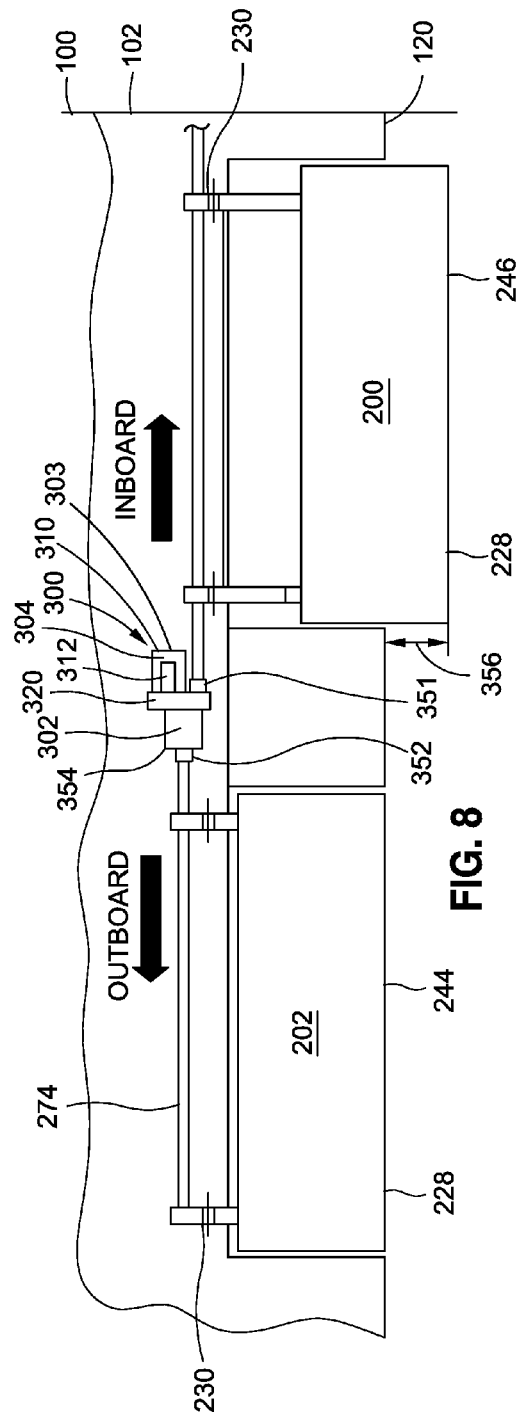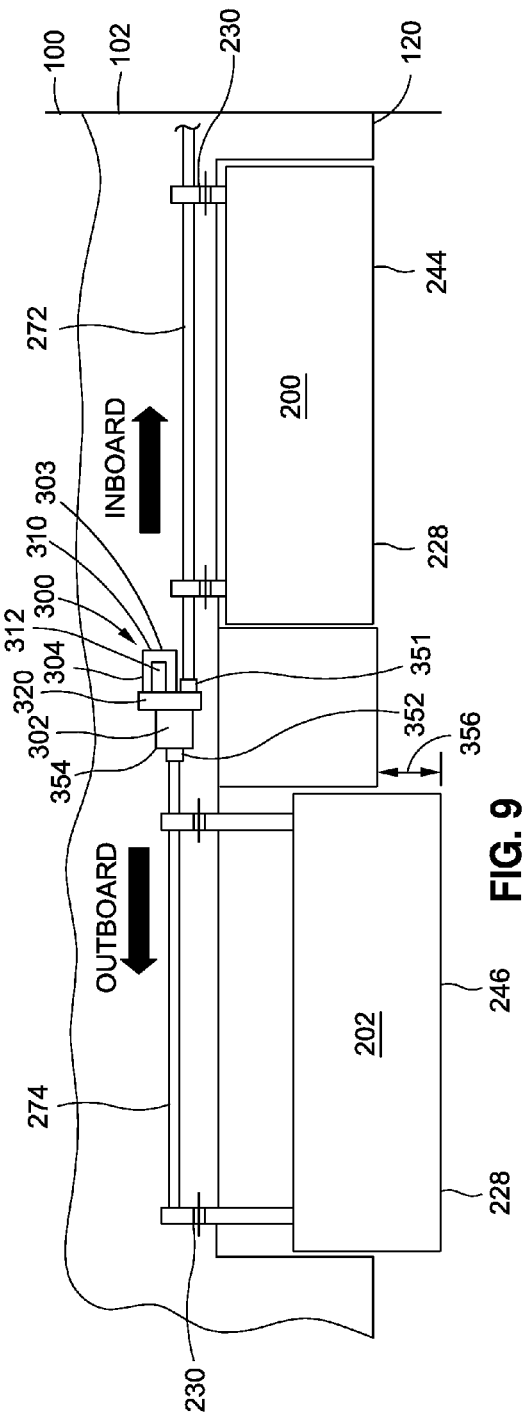

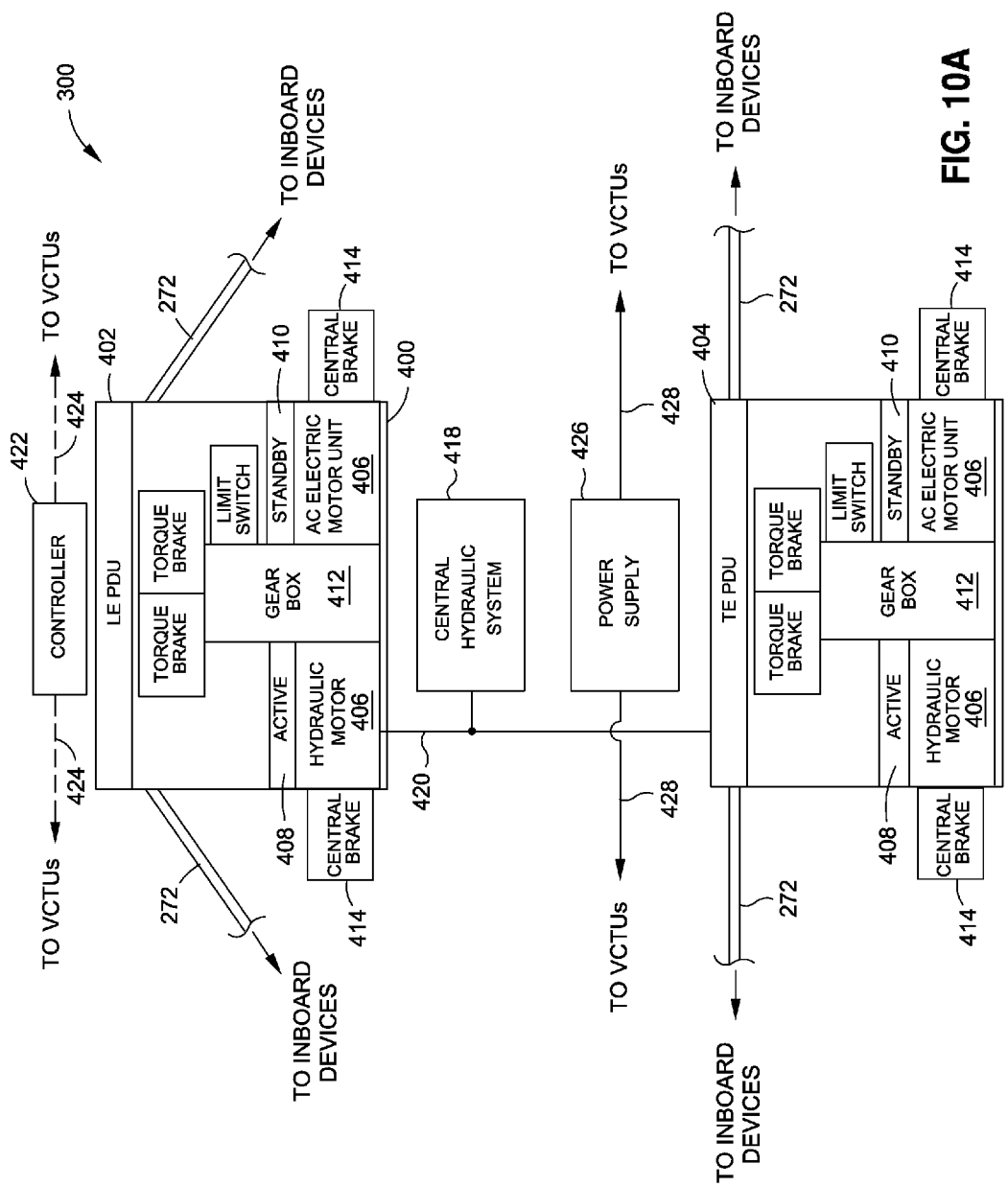

VARIABLE CAMBER FLAP SYSTEM AND METHOD

FIELD

The present disclosure relates generally to aircraft control surfaces and, more particularly, to a variable flap system for an aircraft.

BACKGROUND

Aircraft such as commercial airliners typically include control surfaces or devices mounted on the wings to improve the aerodynamic performance of the aircraft. Such control surfaces include wing leading edge devices and wing trailing edge devices and which may be deflected to improve the lift and/or drag characteristics of the wings. For example, conventional airliners may include inboard and outboard leading edge slats that may be actuated by a centrally-located power drive unit (PDU), and inboard and outboard trailing edge flaps that may also be actuated by a separate PDU. In conventional airliners, the inboard and outboard leading edge slats may be actuated as a single system, as may the inboard and outboard trailing edge flaps.

It may be desirable to actuate the inboard devices at different times and/or to different positions relative to the outboard devices, for example to vary the camber of the wings and/or adjust the spanwise load distribution. Conventional actuation systems typically allow for actuating the inboard and outboard devices together, and some may allow for actuating the inboard devices separately from the outboard devices. However, such actuation systems are typically limited in their ability to actuate inboard and outboard devices separately. Typically, such actuation systems require a complex sequence of movements of the inboard and outboard devices to move the devices to new variable camber positions. Furthermore, the complex sequencing that is typically required to reposition the inboard and outboard devices can take extended periods of time during which the aircraft may be exposed to a significant drag increase, which may reduce the overall benefit provided by the variable camber function.

As can be seen, there may be a need in the art for an improved system and method of actuating inboard and/or outboard devices of a wing that may avoid certain complexities as may exist in conventional actuation systems.

SUMMARY

The above-noted needs associated with positioning inboard and outboard devices of a wing are specifically addressed and alleviated by the present disclosure which provides a variable camber system for an aircraft. The variable camber system may include a variable camber trim unit (VCTU) that may be positioned between an inboard device and an outboard device. The inboard device and the outboard device may be mounted to at least one of a leading edge and a trailing edge of a wing. The VCTU may include a speed sum gearbox having an inboard shaft coupled to the inboard device, and an outboard shaft coupled to the outboard device. The VCTU may additionally include a VCTU electric motor engaged to the speed sum gearbox. The VCTU electric motor may be selectively operable in conjunction with the speed sum gearbox to rotate the outboard shaft independent of the inboard shaft in a manner causing the outboard device to be actuated independent of the inboard device.

Also disclosed is an aircraft having a wing including a leading edge and a trailing edge. The aircraft may include an inboard device and an outboard device mounted to the leading edge and/or the trailing edge. The aircraft may additionally include a variable camber trim unit (VCTU) that may be positioned between the inboard device and the outboard device. The VCTU may include a speed sum gearbox having an inboard shaft coupled to the inboard device and an outboard shaft coupled to the outboard device. The VCTU may additionally include a VCTU electric motor engaged to the speed sum gearbox. The VCTU electric motor may be selectively operable in conjunction with the speed sum gearbox to rotate the outboard shaft independent of the inboard shaft in a manner causing the outboard device to be actuated independent of the inboard device.

Also disclosed is a method of actuating a variable camber system of an aircraft wing. The method may include the step of operating the variable camber system to actuate an inboard device, an outboard device, or both. Inboard devices and/or outboard devices may be mounted to a leading edge and/or a trailing edge of a wing. The variable camber system may include a variable camber trim unit (VCTU) that may be positioned between the inboard device and the outboard device. The VCTU may include a speed sum gearbox having an outboard brake and a VCTU electric motor having a power-off brake. The inboard device may be drivingly coupled to a central motor having a central brake. The outboard device may be drivingly coupled to the VCTU. The step of operating the variable camber system may include actuating the inboard device independent of the outboard device, actuating the outboard device independent of the inboard device, and actuating the inboard and outboard devices in unison.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a is a perspective illustration of an aircraft;

FIG. 2 is a plan view of a wing of the aircraft of FIG. 1 and illustrating inboard and outboard leading-edge devices and trailing-edge devices;

FIG. 3 is a cross-sectional illustration of the wing of FIG. 2 taken along line 3 of FIG. 2 and illustrating an embodiment of a leading edge device and a trailing edge device that may be mounted to the wing;

FIG. 4 is a cross-sectional illustration of the wing of FIG. 3 and showing the leading edge device and the trailing-edge device in a high lift deployed position;

FIG. 5 is a cross-sectional illustration of the wing of FIG. 3 and showing the trailing edge device being deflectable into an upward camber position or a downward camber position;

FIG. 6 is a diagrammatic plan view of a trailing edge portion of the wing taken along line 6 of FIG. 2 and schematically illustrating a variable camber trim unit (VCTU) positioned between an inboard device and an outboard device mounted to the wing trailing edge;

FIG. 7 is a diagrammatic plan view of the trailing edge portion of the wing illustrating the inboard device and outboard device actuated in unison to the same position;

FIG. 8 is a diagrammatic plan view of the trailing edge portion of the wing illustrating the inboard device actuated independently of the outboard device;

FIG. 9 is a diagrammatic plan view of the trailing edge portion of the wing illustrating the outboard device actuated independently of the inboard device;

FIG. 10A is a diagrammatic view of a center portion of the variable camber actuation system and illustrating a leading-edge power drive unit (PDU) and a trailing edge PDU for driving the inboard devices mounted on the respective leading-edge and trailing-edge;

DETAILED DESCRIPTION

Figure 10:
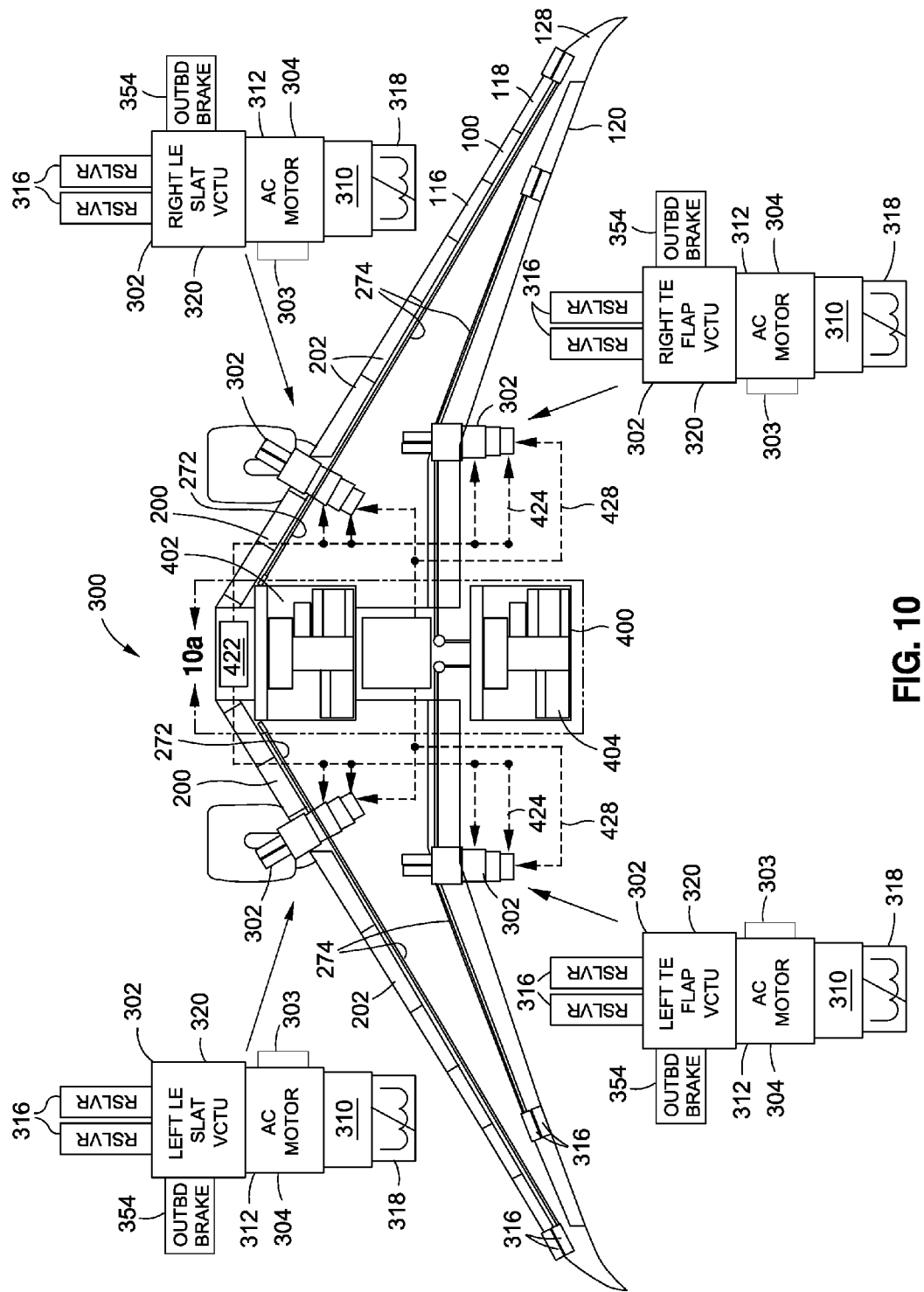
FIG. 10 is a diagrammatic plan view of a variable camber actuation system incorporating a VCTU between the inboard and outboard devices on the leading-edge and trailing-edge of each wing.

Referring now to the drawings wherein the showings are for purposes of illustrating various embodiments of the present disclosure, shown in FIG. 1 is a perspective view of an aircraft 100. The aircraft 100 may include a fuselage 102 having a pair of wings 116 attached to the fuselage 102 at a wing root 126 and extending outwardly toward a wing tip 128. One or more propulsion units 104 may be mounted on the wings 116. The aircraft 100 may further include an empennage including a horizontal tail 108 and elevator 110, and a vertical tail 112 and rudder 114, which may be used for directional control of the aircraft 100. The aircraft 100 may include one or more wing leading edge devices 204 and wing trailing edge devices 228 which may be deflected to improve the lift characteristics and/or drag characteristics of the wings 116. In this regard, the present disclosure includes a variable camber system 300 allowing for dynamic adjustment of the camber characteristics of one or more of the wings 116, e.g., by moving one or more of the leading edge devices 204 and/or trailing edge devices 228. Although the variable camber system 300 is described in the context of a tube-and-wing aircraft 100 configuration as shown in FIG. 1, the variable camber system 300 may be implemented in any aircraft configuration, without limitation, including blended wing configurations, hybrid wing-body configurations, and other configurations.

FIG. 2 shows an embodiment of an aircraft wing 116 incorporating the variable camber system 300. The wing 116 has inboard 200 and outboard 202 leading edge devices 204 mounted to the wing leading edge 118, and inboard 200 and outboard 202 trailing edge devices 228 mounted to the wing trailing edge 120. In the present disclosure, the propulsion unit centerline 106 may be thought of as the dividing line between the inboard devices 200 and the outboard devices 202. In the embodiment shown, the inboard 200 leading edge device 204 may be configured as one or more Krueger flaps 224, and the outboard 202 leading edge devices may be configured as one or more leading edge slats 220. However, the inboard 200 leading edge devices 204 and the outboard 202 leading edge devices 204 may be provided in any configuration, and are not limited to Krueger flaps 224 and leading edge slats 220. The inboard device 200 may be coupled to an inboard torque tube 272 or other mechanical linkage for actuating the inboard device 200 such as by a centrally-located power drive unit (PDU—not shown) as described below. Likewise, the outboard devices 202 may be coupled to an outboard torque tube 274 or other mechanical linkage for actuating the outboard devices 202. When deployed, the leading edge devices 204 may generally increase the effective camber of the wings 116 and maintain airflow over the wing upper surface 122 at high angles of attack.

In FIG. 2, the trailing edge inboard devices 200 may include a trailing edge flap 254, and an inboard roll-control flap device, which may be configured as a flaperon 258 (e.g. combination flap-aileron). The outboard devices 202 may include one or more outboard trailing edge flaps 254, and an outboard roll-control flap device such as an aileron 262. Similar to the above-described leading edge devices 204, the inboard devices 200 on the trailing edge 120 may be coupled to an inboard torque tube 272 which may be actuated by a centrally-located power drive unit (PDU—not shown). The outboard devices 202 on the trailing edge 120 may be coupled to an outboard torque tube 274. In FIG. 2, the inboard torque tube 272 may include a universal joint 276 or similar mechanism to accommodate the geometry change in the wing trailing edge 120. Spoilers 264 may also be mounted on the wing upper surface 122 and may partially overlap the forward edge of the trailing edge devices 228. Deployment of the spoilers 264 may act as speed brakes for decelerating the aircraft 100 during flight, and/or to reduce aerodynamic lift of the wings 116 during landing after touchdown or during a rejected take-off such that the weight of the aircraft 100 may be transferred to the landing gear for improved braking performance.

In FIG. 2, the variable camber system 300 may include a variable camber trim unit (VCTU) 302 that may be positioned between an inboard device 200 and an outboard device 202.

For example, in the wing embodiment illustrated in FIG. 2, a motorized VCTU 302 with a speed sum gearbox (not shown) may be located at the leading edge 118 of the wing 116 of the aircraft 100 between the inboard Krueger flap 224 and the outboard leading edge slats 220. Likewise, on each wing 116, a motorized VCTU 302 with the speed sum gearbox (not shown in FIG. 2) may be located at the trailing edge 120 between the inboard flaperon 258 and the outboard trailing edge flaps 254. One or more of the VCTUs 302 may cooperate with one or more PDUs (e.g., PDU 400 as shown in FIGS. 10 and 10A) to provide dynamic adjustment of any of the leading edge devices 204 and/or trailing edge devices 228 to vary the camber of the wing 116 such as along a spanwise direction. In this regard, the VCTUs 302 may allow for differential motion between the outboard 202 and inboard devices 200 such that the outboard devices 202 may be driven independently of the inboard devices 200.

In FIG. 3, shown is a cross-section of an embodiment of a wing 116. The wing 116 includes a leading edge device 204 configured as a leading edge slat 220, and a trailing edge device 228 configured as a trailing edge flap 254. In FIG. 3, the leading edge device 204 and trailing edge device 228 are shown in their neutral or stowed positions 214, 244, respectively. The leading edge device 204 may be supported on a leading edge linkage assembly 206. In the embodiment shown, the linkage assembly 206 may include one or more guide tracks 208 which may be supported by one or more guide rollers 212. Deployment of the leading edge device 204 may be effected by rotating the leading edge torque tube by the VCTU 302 operating in conjunction with the PDU (not shown). In an embodiment, a pinion gear 210 may be mounted on the torque tube 274. The pinion gear 210 may be configured to engage a corresponding gear track (not shown) of the linkage assembly 206 for deploying and retracting the leading edge device 204.

FIG. 3 shows an example of a trailing edge device 228, which in this example is configured as a flap 254 supported on a drop hinge 236. The drop hinge 236 may include a wing bracket 238 extending downwardly from the wing 116. The trailing edge device 228 may include a flap bracket 240 that may be pivotably coupled to the wing bracket 238 such that the trailing edge device 228 is rotatable about a hinge axis 242. The flap bracket 240 may be actuated by a trailing edge linkage assembly 230 coupled to one of the torque tubes 272, 274. A pivot arm 232 may be fixedly coupled to the respective torque tube 272, 274. A link 234 may extend between the pivot arm 232 and the flap bracket 240 for actuating the trailing edge device 228. The wing 116 may include one or more spoilers 264 mounted along the wing upper surface 122 and partially overlapping a forward edge of the trailing edge device 228. Although the trailing edge device 228 is shown in FIG. 3 as a simple flap 254 mounted on a drop hinge 236, the variable camber system 300 may be implemented in any one of a variety of different configurations of trailing edge devices 228, and is not limited to the drop hinge 236 flap 254 shown in the example in FIG. 3. For example, the trailing edge devices 228 may be configured as plain flaps, single-slotted flaps, multi-slotted Fowler flaps, or any one of a variety of other flap configurations.

In FIG. 4, shown is a cross-section of the wing 116 wherein the leading edge device 204 and the trailing edge device 228 are each in a deployed position 216, 246. The leading edge slat 220 may be configured to move forward and downwardly during deployment into a desired leading edge deflection angle 218, and which may result in an increase in wing camber and/or an increase in wing surface area. In this regard, the leading edge devices 204 and trailing edge device 228 may function as high-lift devices e.g., by providing improved aerodynamic wing lift as may be desirable during low-speed flight operations. The variable camber system 300 disclosed herein may facilitate differential deflection of the leading edge slats 220 in a simplified manner. For example, during takeoff, climb out, and/or landing in a swept wing aircraft 100, it may be desirable to extend the outboard 202 leading edge devices 204 further or at a greater deflection angle 218 than the inboard 200 leading edge devices 204 such that in the event of a stall, the inboard portion of the wing 116 stalls first causing the nose of the aircraft 100 to drop and allowing for relatively rapid stall recovery. The trailing edge device 228 is shown deflected to a trailing edge device deflection angle 252 or flap setting which may increase wing camber. Depending upon the location of the hinge axis 242, deployment of the trailing edge device 228 may also increase the wing surface area.

Deployment of the trailing edge flaps 254 may be effected by rotation of one or more of the torque tubes 272, 274. The spoilers 264 may be configured to be positioned in a drooped position 268, e.g. as shown in FIG. 4, which may maintain continuity of airflow over the wing upper surface 122 and the trailing edge device 228. The spoilers 264 may also be configured to be deployed in a conventional upward direction (e.g., deployed position 270) to increase drag such as during flight and/or to disrupt the airflow over the wing upper surface 122 and thereby reduce aerodynamic lift such as during on-ground operations.

In FIG. 5, shown is a cross-section of the wing 116 illustrating deflection of the trailing edge device 228 from a neutral position toward an upward camber position 248, or from the neutral position toward a downward camber position 250. The variable camber system 300 may be configured to deploy one or more of the trailing edge devices 228 to relatively small deflection angles 252. In some examples, the trailing edge devices 228 may be deployable to deflection angles 252 on the order of several degrees (e.g., +/−1-3 degrees or more). As indicated above, the variable camber system 300, and more specifically, the VCTU 302 operating in conjunction with a PDU 400 (FIG. 10), may enable differential deployment of the inboard devices 200 relative to the outboard devices 202 along a spanwise direction in order to vary the wing camber along the spanwise direction. Advantageously, spanwise variation of the wing camber may improve the aerodynamic performance characteristics of the wing 116 and/or flight loading of the wing 116 during certain phases of flight. For example, during takeoff and/or landing, the trailing edge inboard devices 200 may be deployed at a different deployment angle than the trailing edge outboard devices 202 to vary the wing camber along a spanwise direction as a means to improve the lift characteristics of the wing 116. During cruise, the trailing edge inboard devices 200 and outboard devices 202 may be differentially deployed to improve the spanwise load distribution along the wing, optimize the lift-to-drag ratio (L/D), and/or reduce aerodynamic drag to increase fuel efficiency and/or range.

FIG. 6 is a diagrammatic view of a portion of a wing trailing edge 120 illustrating a VCTU 302 positioned between a trailing edge inboard device 200 and a trailing edge outboard device 202. As indicated earlier, the inboard device 200 may be coupled to an inboard torque tube 272 by one or more linkage assemblies 230, and the outboard device 202 may be coupled to an outboard torque tube 274 by one or more linkage assemblies 230. A similar arrangement may be provided for the leading edge devices 204. The VCTU 302 may include a dedicated VCTU electric motor 304 and a speed sum gearbox 320 having an outboard brake 354. The VCTU electric motor 304 may have a dedicated power-off brake 310. The inboard device 200 may be drivingly coupled to a central motor 406 (e.g., as shown in FIGS. 10-10A) of a PDU. The VCTU electric motor 304 and speed sum gearbox 320 may be assembled as an integrated unit that may be operated in conjunction with the PDU 400 to control the actuation of the outboard devices 202 relative to the inboard devices 200.

FIG. 7 is a diagrammatic view of the wing trailing edge portion of FIG. 6 and illustrating the operation of the VCTU 302 in conjunction with the PDU 400 (see FIG. 10) to activate the outboard device 202 and the inboard device 200 in unison. As described in greater detail below, the power-off brake 310 may initially be applied to prevent rotational movement of the VCTU electric motor 304. The central motor 406 of the PDU 400 (e.g., as shown in FIGS. 10-10A) may be activated for drivingly actuating the inboard device. With the power-off brake 310 applied, actuation of the inboard device 200 by the central motor 406 rotates the inboard torque tube 272. When the power-off brake 310 is applied, the rotational movement of the inboard torque tube 272 is transferred through the speed sum gearbox 320 to the outboard torque tube 274 resulting in actuation of the inboard device 200 and the outboard device 202 in unison.

FIG. 8 shows the trailing edge portion of the wing 116 wherein the inboard device 200 is actuated independently of the outboard device. As described below, for independent actuation of the inboard device, the power-off brake 310 of the VCTU electric motor 304 is released. The outboard brake 354 of the VCTU 302 is applied to prevent movement of the outboard device 202. The central motor 406 of the PDU 400 (not shown) is activated as described above resulting in rotation of the inboard torque tube 272. The speed sum gearbox 320 is configured such that rotation of the inboard torque tube 272 causes the VCTU electric motor 304 to be back-driven while the inboard device 200 is actuated by the central motor 406, as described in greater detail below.

FIG. 9 shows the trailing edge portion of the wing 116 wherein the outboard device 202 is actuated independently of the inboard device 200. As described below, for independent actuation of the outboard device 202, the central motor 406 of the PDU 400 is prevented from rotating the inboard device 200 by applying a central brake 414 (FIG. 10A) which may be coupled to the central motor 406 and included in the PDU 400. The outboard brake 354 of the VCTU 302 is released. Additionally, the power-off brake 310 of the VCTU electric motor 304 is released. The VCTU electric motor 304 is then activated causing rotation of the outboard torque tube 274 and resulting in actuation of the outboard device 202 independent of the inboard device 200. In an embodiment, the amount of movement of the outboard device 202 may be limited to avoid exceeding a predetermined maximum inboard-outboard device split 356 limit which may represent a maximum allowable difference in deployment angles or deployment positions of the inboard device 200 and the outboard device 202 relative to one another.

The variable camber system 300 disclosed herein may provide a means for driving the outboard device 202 and/or the inboard device 200 independently of one another in a simplified manner relative to conventional clutch-based systems which may require a relative large number of discrete movements for positioning the inboard device 200 and/or outboard device 202 at target variable camber positions. The variable camber system 300 disclosed herein may simplify asymmetric outboard device 202 movements and may improve the feasibility of differential deployment angles as may be desirable during certain phases of flight such as during takeoff and landing, as indicated above.

FIG. 10 is a diagrammatic view of a variable camber actuation system incorporating VCTUs 302 between the inboard devices 200 and outboard devices 202 on the leading edge 118 and trailing edge 120 of each wing 116 of the aircraft 100. The variable camber system 300 may operate in conjunction with at least one centrally-located PDU. In the embodiment shown, the variable camber system 300 may include a leading edge PDU 402 coupled to the leading edge devices 204 on opposite sides of the fuselage 102, and a trailing edge PDU 404 coupled to the trailing edge devices 228 on opposite sides of the fuselage 102. The variable camber system 300 may be controlled by flight control electronics 422 which may be centrally-located on the aircraft 100 and/or may be positioned adjacent to one or both of the PDUs 400. The flight control electronics 422 may be configured to generate command signals representative of target variable camber positions of the leading edge devices 204 and the trailing edge devices 228. The command signals may be transmitted via one or more command lines 424 or wirelessly transmitted to the leading edge PDU, the trailing edge PDU, and to the motor controller 303 of each VCTU 302. In this regard, each motor controller 303 may control the VCTU electric motor 304, the outboard brake 354, and/or the power-off brake 310 of the VCTU 302. The flight control electronics 422 may transmit command signals to the motor controller 303 of the VCTU electric motor 304 and to the central motor 406 causing actuation (e.g., deployment and retraction) of at least one of the inboard device 200 and the outboard device 202 according to a minimum actuation step as described below. The flight control electronics 422 may receive position signals from one or more position sensors 312 (see e.g., FIGS. 6-9) that may be included with each one of the VCTUs 302. The position signals may represent the current position or deflection angle of each one of the inboard devices 200.

In FIG. 10, the variable control system may further include a central power supply 426 for powering the VCTU electric motor 304 of each one of the VCTUs 302. The power supply 426 may be centrally-located such as adjacent to the PDUs 400. In an embodiment, each VCTU electric motor 304 may include the above-mentioned motor controller 303 which may be powered by the central power supply 426 with a substantially continuous supply of relatively low-voltage power. Such low-voltage power may be removed from the motor controller 303 for certain types of faults. Relatively high-voltage power may be provided to the VCTU electric motors 304 from the central power supply 426 via an electric supply line 428 to cause the VCTU electric motor 304 to rotate such as in response to a command signal transmitted along a command line 424 from the flight control electronics 422 to the motor controller 303.

As shown in FIG. 10, each one of the VCTUs 302 may include a VCTU electric motor 304 and a speed sum gearbox 320. An outboard brake 354 may be included with each VCTU 302 to prevent rotation of the outboard device 202 as indicated above. The VCTU 302 may include the above-mentioned power-off brake 310 which may be coupled to the VCTU electric motor 304 and which may be applied by one or more coils 318. The coils 318 may receive power from the centrally-located central power supply 426 via an electric supply line 428 for activating the power-off brake 310 such as in response to a command signal received from the flight control electronics 422 via a command line 424. One or more resolvers 316 may be included at different locations on the leading edge devices 204 and/or trailing edge devices 228 for indicating the positions of such devices 204, 228 and which may be provided to the flight control electronics 422.

FIG. 10A is a diagrammatic view of a center portion of the variable camber actuation system showing the leading edge PDU 402 and the trailing edge PDU 404. As indicated earlier, the leading edge PDU 402 and the trailing edge PDU 404 may be coupled to the inboard torque tubes 272 on the leading edge 118 and the trailing edge 120 of the wing 116. In an embodiment, each one of the PDUs 400 may include at least one central motor 406. For example, in FIG. 10A, each one of the PDUs 400 may include an active motor 408 and a backup motor 410. Each one of the central motors 406 may be coupled to or may include a central brake 414 configured as a power-off brake for preventing rotation of the central motor 406 and thereby preventing actuation of the inboard device 200 to which the central motor 406 is coupled.

In FIG. 10A, in an embodiment, the active motor 408 and/or the backup motor 410 may be configured as a hydraulic motor or an electrohydraulic actuator which may be coupled to a central hydraulic system 418 via one or more hydraulic lines 420. In an embodiment, the active motor 408 and/or the backup motor 410 may optionally be configured as an electromechanical actuator or an electric motor for controlling the actuation of the inboard device. The central motors 406 may be coupled to the inboard torque tubes 272 for driving the inboard devices 200. Each one of the PDUs 400 may include a central gearbox 412 and one or more central brakes 414. Each one of the central motors 406 may be coupled to a central brake 414 (e.g., a power-off brake) which may be configured to prevent movement of the inboard device 200 when both central brakes 414 are applied.

Figure 11:
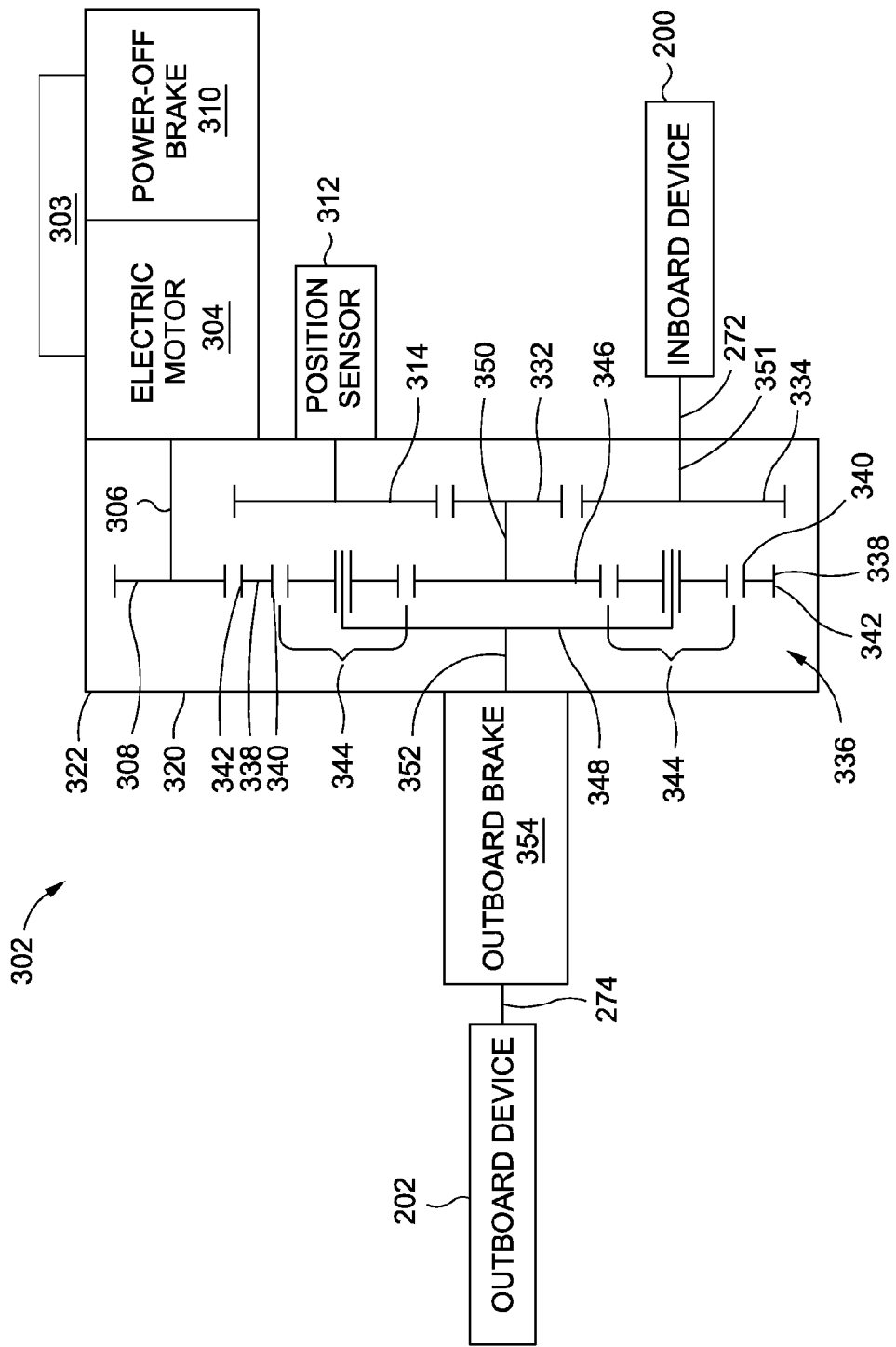
FIG. 11 is a schematic block diagram of the VCTU illustrating a speed sum gearbox having an outboard brake and a VCTU electric motor having a power-off brake.

FIG. 11 is a schematic diagram of an embodiment of a VCTU 302 illustrating the interconnection of the speed sum gearbox 320 with the outboard brake 354, the VCTU electric motor 304 and power-off brake 310, and the position sensor 312. The speed sum gearbox 320 includes an inboard shaft 351 that may be coupled to the inboard device 200 via an inboard torque tube 272, and an outboard shaft 352 that may be coupled to the outboard device 202 via an outboard torque tube 274. The VCTU electric motor 304 may include a motor shaft 306 having a motor pinion 308 that may be engaged to a ring gear 338 of the speed sum gearbox 320. The speed sum gearbox 320 may be configured such that if one of the three shafts (i.e., the inboard shaft 351, the outboard shaft 352, the motor shaft 306) is held stationary and prevented from rotating, the remaining pair of shafts will rotate under the driving force of one of the remaining shafts of the pair. For example, if the inboard shaft 351 is prevented from rotating due to application of the central brake 414 of the PDU, then rotation of the motor shaft 306 will cause rotation of the outboard shaft 352 resulting in actuation of the outboard device 202 independent of the inboard device 200. If the motor shaft 306 is prevented from being rotated due to application of the power-off brake 310, then rotation of the inboard shaft 351 will cause rotation of the outboard shaft 352 resulting in actuation of the inboard and outboard device 202 in unison with one another. If the outboard shaft 352 is prevented from rotating due to application of the outboard brake 354, then rotation of the inboard shaft 351 by the central motor 406 will cause the VCTU electric motor 304 to be back-driven while the inboard device 200 is actuated and the outboard device 202 is stationary In FIG. 11, the inboard shaft 351 may be fixedly (e.g., non-rotatably) coupled to the inboard device 200 via the inboard torque tube 272. The outboard shaft 352 may be fixedly (e.g., non-rotatably) coupled to the outboard device 202 via the outboard torque tube 274. The inboard shaft 351 may include an inboard pinion 334 that may be coupled to an inboard gear 332 of the speed sum gearbox 320. The inboard gear 332 may be mounted on or fixedly (i.e., non-rotatably) coupled to a sun gear shaft 350 of a sun gear 346 of the speed sum gearbox 320. The position sensor 312 may include a position sensor gear 314 that may be engaged to the inboard gear 332 for sensing a position of the inboard device 200 and transmitting a position signal to the flight control electronics 422. The speed sum gearbox 320 may include a plurality of planet gears 344 that may be supported on a carrier 348. The carrier 348 may be fixedly (i.e., non-rotatably) coupled to or mounted on the outboard shaft 352. The planet gears 344 may encircle and may be engaged to the sun gear 346. The plurality of planet gears 344 may be circumscribed by a ring gear 338. The motor pinion 308 may be engaged to an external side 342 of the ring gear 338.

Figure 12:
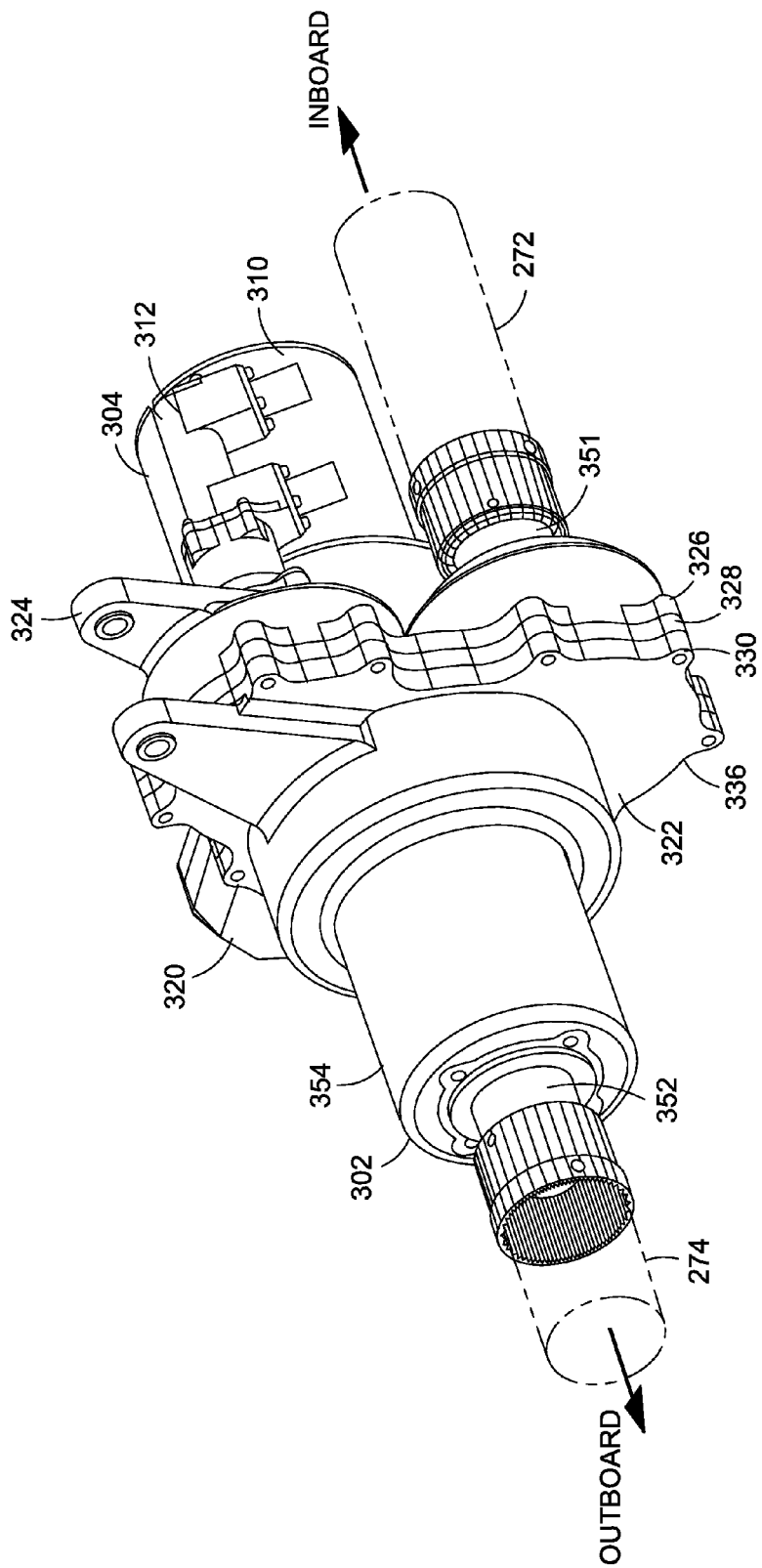
FIG. 12 is a perspective illustration of an embodiment of the VCTU.

FIG. 12 is a perspective illustration of an embodiment of the VCTU 302 and showing the inboard torque tube 272 coupled to the inboard shaft 351 and the outboard torque tube 274 coupled to the outboard shaft 352 of the speed sum gearbox 320. The VCTU 302 may comprise an integrated unit including the VCTU electric motor 304 and associated power-off brake 310, outboard brake 354, and position sensor 312, all of which may be supported by or enclosed, at least partially, within the VCTU housing 322. The VCTU housing 322 may include one or more mounting tabs 324 for mounting the VCTU 302 to the wing structure of an aircraft 100.

Figure 13:
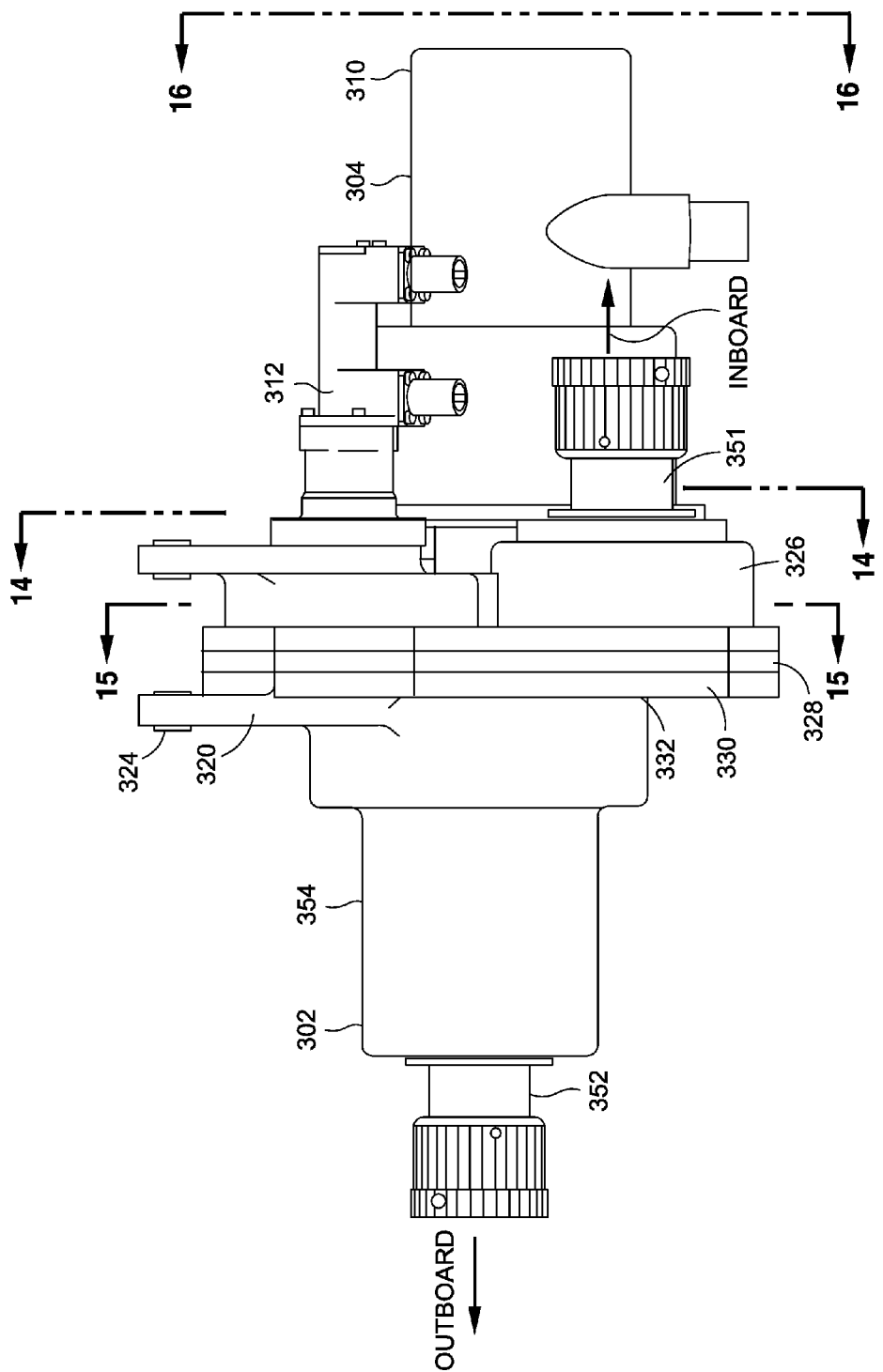
FIG. 13 is a forward-looking view of an aft side of the VCTU.

FIG. 13 is a forward-looking view of the VCTU 302 illustrating the VCTU housing 322. In an embodiment, the VCTU housing 322 may be made up of an inner housing 326 on the inboard side of the VCTU 302, an outer housing 330 on an outboard side of the VCTU 302, and a mid housing 328 sandwiched between the inner housing 326 and the outer housing 330. Although not shown, the inner housing 326, the mid housing 328, and the outer housing 330 may be mechanically coupled together such as with mechanical fasteners. The three-piece arrangement of the housing may facilitate assembly and disassembly of the VCTU 302 such as for maintenance and inspection. Although not shown, the VCTU housing 322 may be sealed from the elements by a seal extending around a perimeter at the interface of the housings. The VCTU housing 322 may be configured to provide a relatively rigid load path for operational loads.

Figure 14:
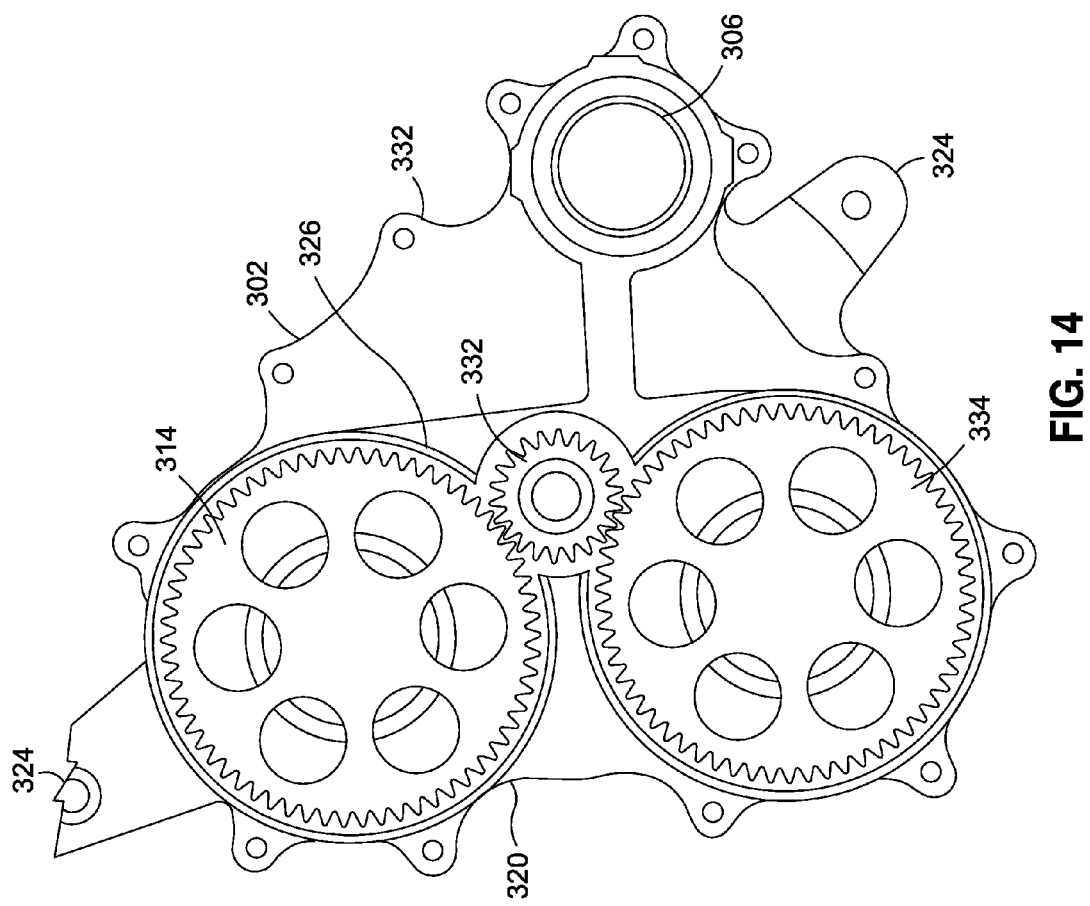
FIG. 14 is a sectional view of the VCTU taken along line 14 of FIG. 13 and illustrating an inboard pinion and a position sensor gear operatively engaged to one another by an inboard gear.

FIG. 14 is a sectional view of the VCTU 302 showing the inboard pinion 334 and the position sensor gear 314 operatively engaged to one another by the inboard gear 332. In an embodiment, the inboard gear 332 may be omitted, and the inboard shaft 351 may be directly coupled to the sun gear 346. In such an arrangement, the position sensor gear 314 may be engaged to another gear (not shown) that may be mounted on or integrally formed with the inboard shaft 351 to allow the position sensor 312 to sense the position of the inboard device 200 for transmitting a representative position signal to the flight control electronics 422.

Figure 15:
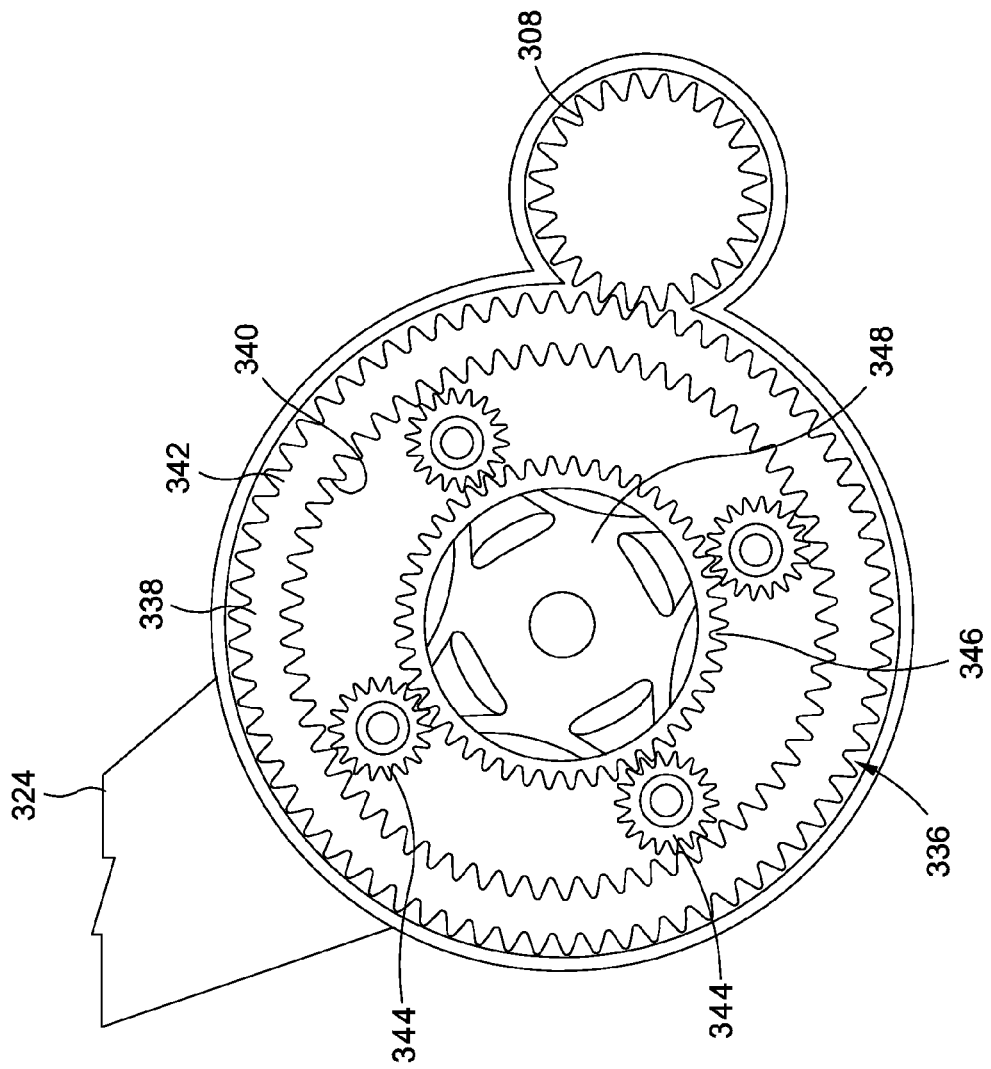
FIG. 15 is a sectional view of the VCTU taken along line 15 of FIG. 13 and illustrating the speed sum gearbox configured as a planetary gear system.

FIG. 15 is a sectional view of the VCTU 302 showing the speed sum gearbox 320 configured as a planetary gear system 336. As indicated above, the speed sum gearbox 320 includes a central sun gear 346 having gear teeth and which is surrounded by a plurality of planet gears 344. The planet gears 344 are supported on the carrier 348 which may be fixedly mounted to the outboard shaft 352. The gear teeth of the planet gears 344 are engaged to the gear teeth on the internal side 340 of the ring gear 338 which circumscribes the planet gears 344. The motor pinion 308 of the VCTU electric motor 304 are engaged to the external side 342 of the ring gear 338.

Figure 16:
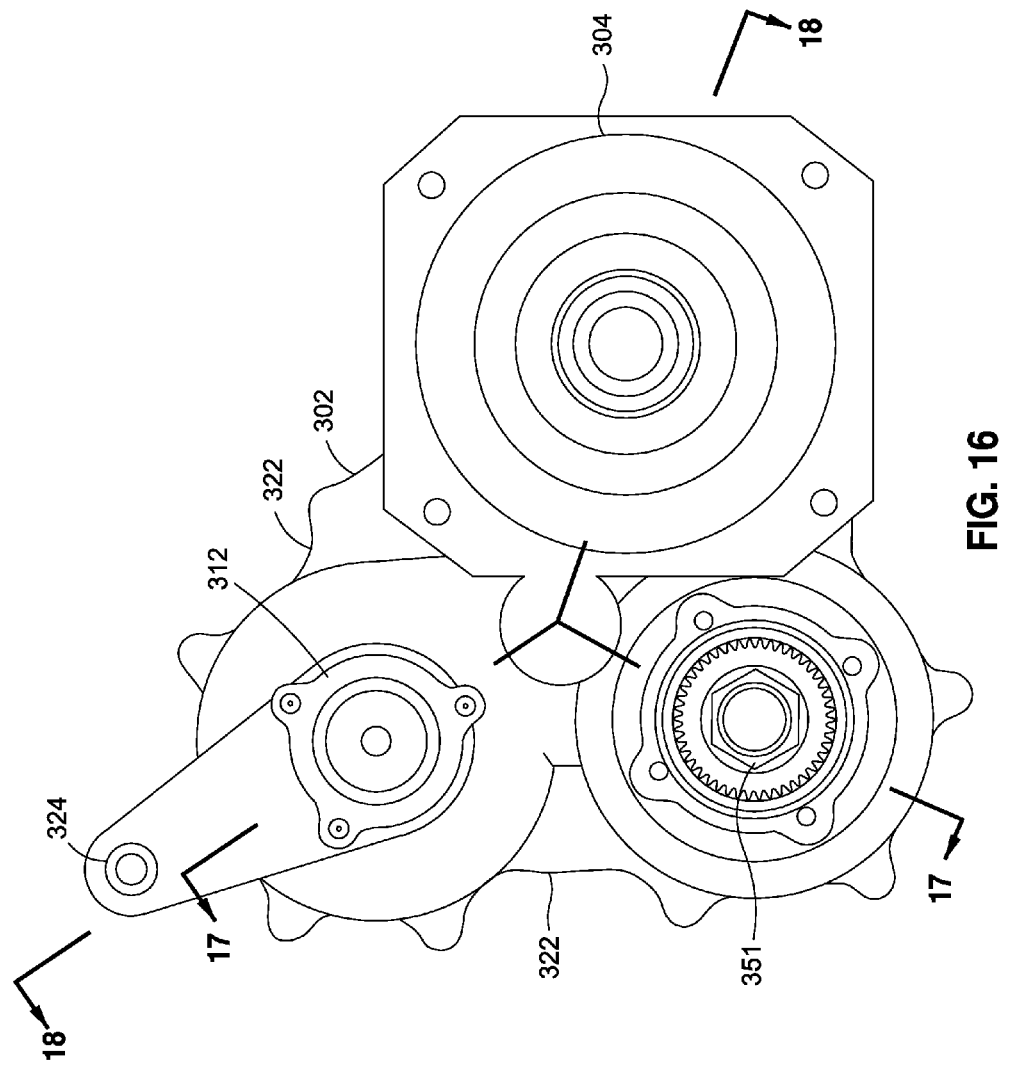
FIG. 16 is an end view looking outboard at the VCTU taken along line 16 of FIG. 13 and illustrating an inboard shaft of the speed sum gearbox and further illustrating the VCTU electric motor and the outboard brake.

FIG. 16 is an end view of the VCTU 302 showing the inboard shaft 351 of the speed sum gearbox 320 and illustrating the VCTU electric motor 304 and the outboard brake 354. Also shown is the interface for the position sensor 312. The position sensor 312 has a position sensor gear 314 which is engaged to the inboard gear 332 for sensing the position of the inboard device 200.

Figure 17:
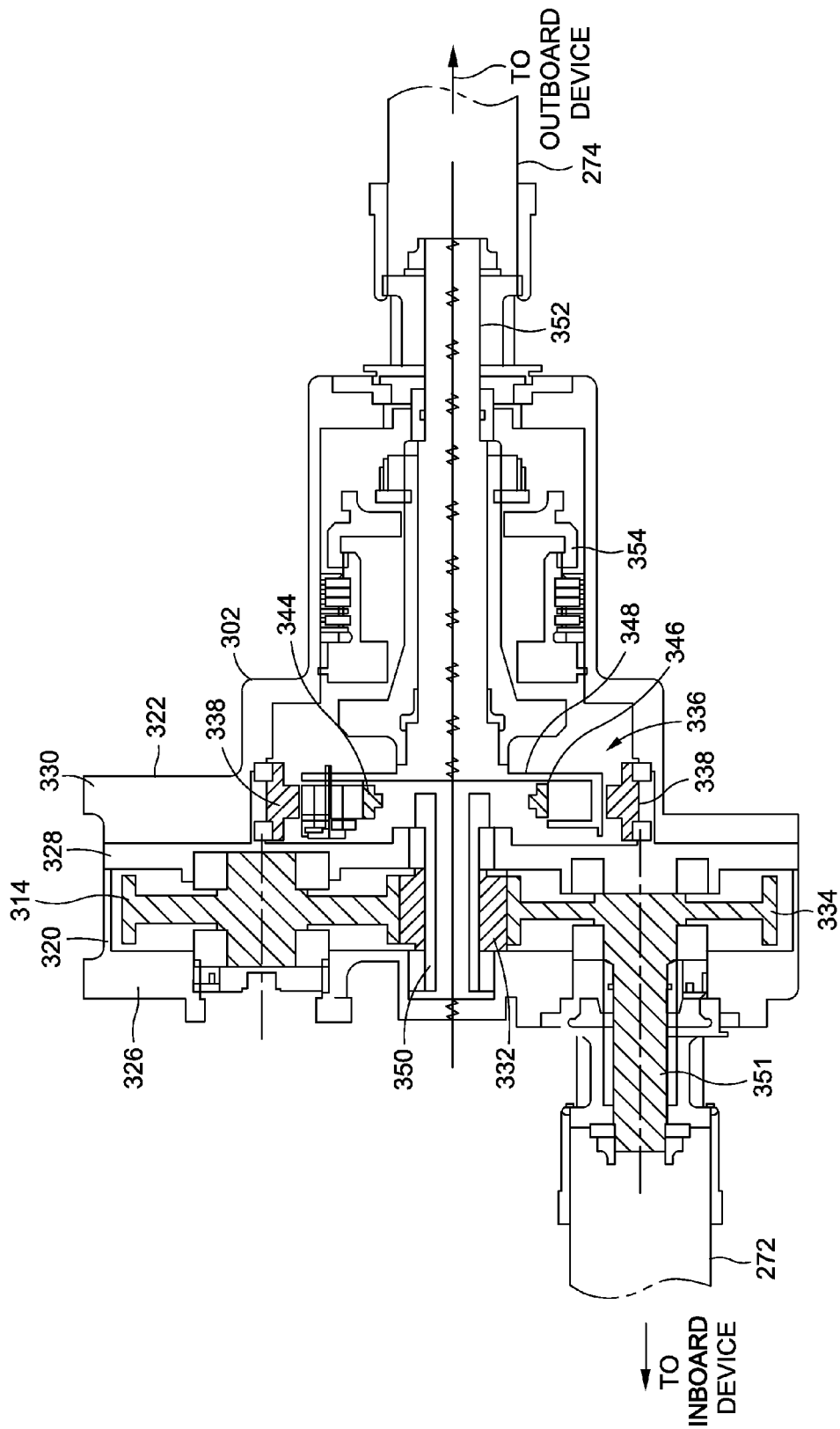
FIG. 17 is a sectional view of the VCTU taken along line 17 of FIG. 16 and illustrating the interconnectivity of the inboard pinion, the inboard gear, and the position sensor gear.

FIG. 17 is a sectional view of the VCTU 302 showing the interconnectivity of the inboard pinion 334, the inboard gear 332, and the position sensor gear 314 which are shown in crosshatching. The inboard torque tube 272 is fixedly coupled to the inboard shaft 351. The inboard shaft 351 includes the inboard pinion 334 which includes gear teeth that are engaged to the gear teeth of the inboard gear 332. The inboard gear 332 is mounted on one end of the sun gear shaft 350. The sun gear 346 is mounted on an opposite end of the sun gear shaft 350.

Figure 18:
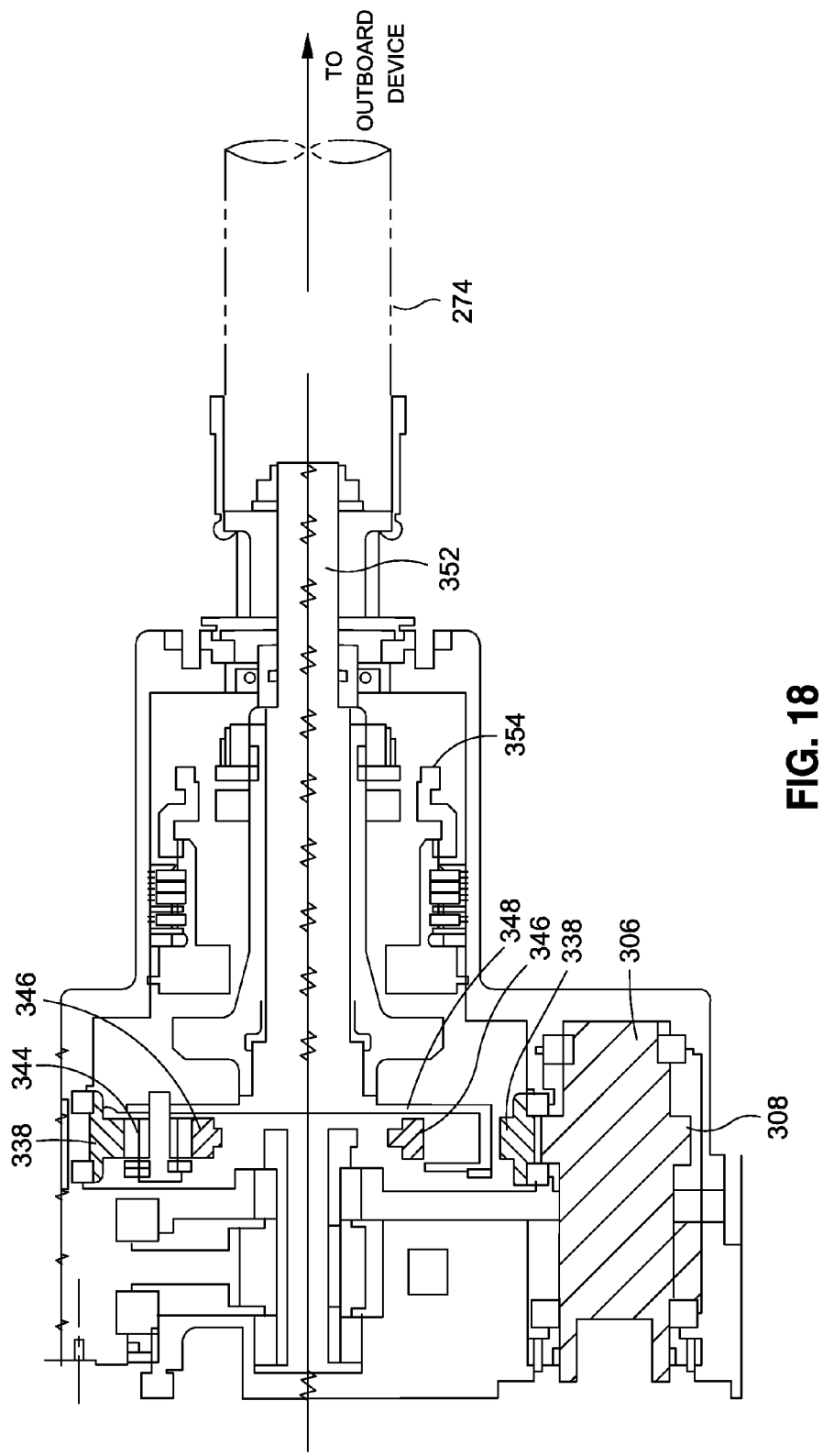
FIG. 18 is a sectional view of the VCTU taken along line 18 of FIG. 16 and illustrating the interconnectivity of the planetary gear system and the outboard brake.

FIG. 18 shows the interconnectivity of the planetary gear system 336 and the arrangement of the outboard brake 354 in an embodiment. The gear teeth of the motor pinion 308 are engaged to the gear teeth on the external side 342 of the ring gear 338. As indicated above, the carrier 348 is mounted on or integrated with the outboard shaft 352 which may generally extend through the outboard brake 354.

Figure 19:
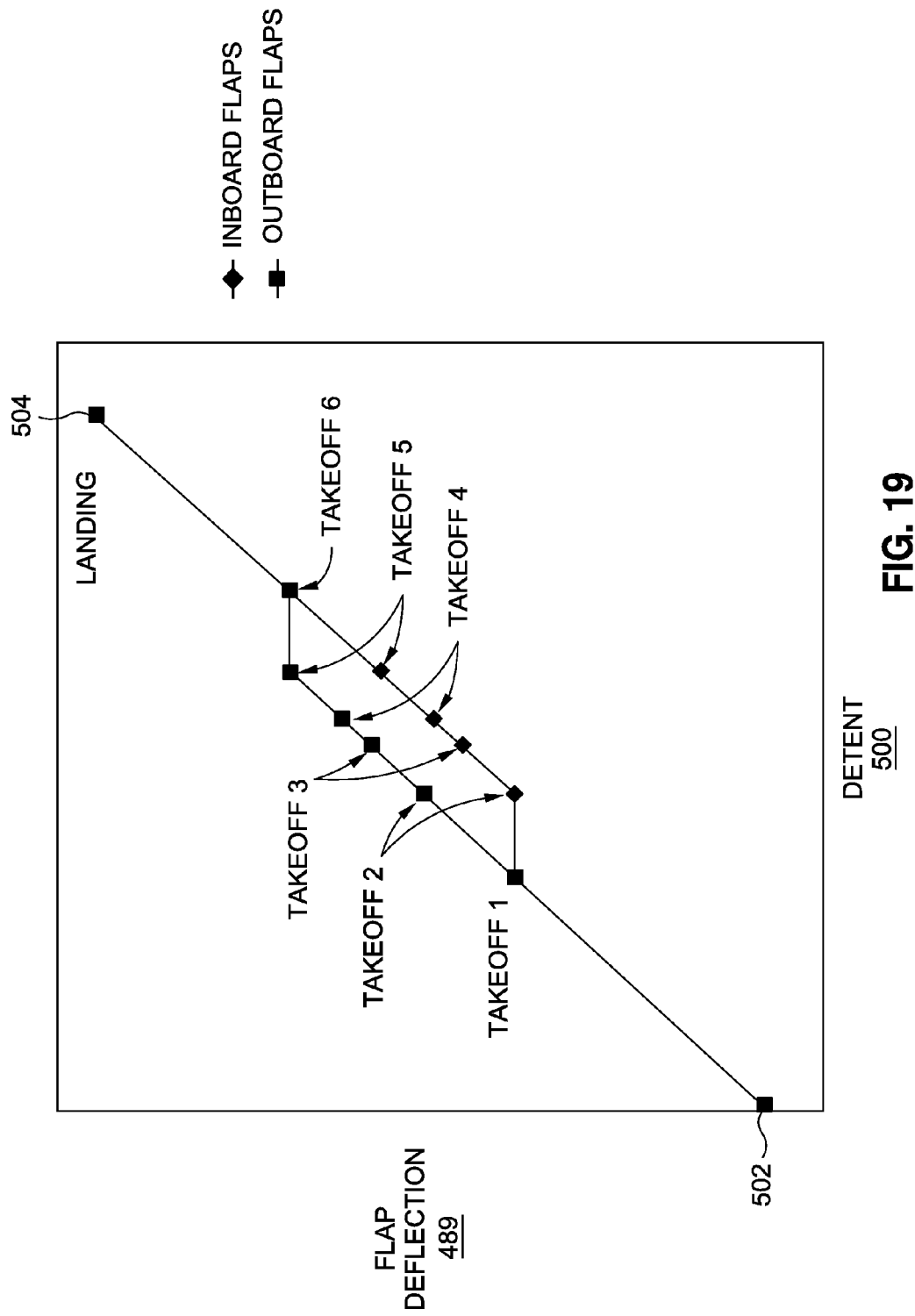
FIG. 19 is a graph illustrating an implementation of the variable camber system with differential inboard and outboard leading-edge device positions for intermediate takeoff flap detents.

FIG. 19 is a graph representing flap deflection 489 versus flap detent 500 according to some examples of the present disclosure. In FIG. 19, flap deflection 489 is displayed along the vertical axis and flap detent 500 setting is displayed along a horizontal axis. The graph illustrates differential inboard and outboard trailing edge device positions for intermediate takeoff flap detents in an implementation of the variable camber system 300. At flap detents "Takeoff 2" through "Takeoff 5", the outboard flaps are extended further than the inboard flaps. The inboard and outboard flaps are aligned at other settings. For example, starting at a "Cruise-Flaps Up" detent 502, both the inboard flaps and the outboard flaps may be stowed in a neutral or non deflectable position. The inboard flaps and outboard flaps may be extended in unison to the same deflection angle at the "Takeoff 1" flap detent. Deployment of the inboard and outboard flaps in unison may be effected by applying the power-off brake 310 on the VCTU electric motor 304 such that actuation of the inboard device 200 by the central motor 406 also results in actuation of the outboard device, similar to that which is illustrated in FIG. 7.

In FIG. 19, at the "Takeoff 2" flap detent, the variable camber system 300 maintains the inboard flaps at the current deflection angle, and extends the outboard flaps further to a different deflection angle than the inboard flaps, similar to that which is illustrated in FIG. 9. Advantageously, the variable camber system 300 disclosed herein provides a means for actuating the outboard devices 202 independently of the inboard devices 200 by applying the central brake 414 to prevent movement of the inboard device, releasing the power-off brake 310 of the VCTU electric motor 304, releasing the outboard brake 354, and activating the VCTU electric motor 304 to drive the actuation of the outboard device.

In FIG. 19, for the "Takeoff 3," "Takeoff 4," and "Takeoff 5" flap detents, movement of the inboard flaps and outboard flaps is performed in unison by applying the power-off brake 310 to prevent rotation of the VCTU electric motor 304, releasing the central brake 414, and activating the central motor 406 to actuate the inboard device 200 which also causes actuation of the outboard device 202 in unison with the inboard device, in a manner similar to that which is illustrated in FIG. 7. For the "Takeoff 6" flap detent, the variable camber system 300 maintains the outboard flaps at their current deflection angle, and further extends the inboard flaps to the same deflection angle as the outboard flaps by releasing the power-off brake 310, applying the outboard brake 354 to prevent movement of the outboard device, releasing the central brake 414, and activating the central motor 406 to actuate the inboard flaps independent of the outboard flaps, while back-driving the VCTU electric motor 304, in a manner similar to that which is illustrated in FIG. 8. For the "Landing" flap detent 504, movement of the inboard flaps and outboard flaps is performed in unison using the above-described procedure.

The present disclosure includes a method of actuating high-lift devices of an aircraft wing. The method may include operating the variable camber system 300 to actuate an inboard device 200, an outboard device 202, or both. As indicated above, the inboard device 200 and the outboard device 202 may be mounted to at least one of a leading edge 118 and a trailing edge 120 of a wing 116. The variable camber system 300 may include a VCTU 302 positioned between the inboard device 200 and the outboard device 202. The method of operating the variable camber system 300 may include actuating the inboard device 200 independent of the outboard device 202, actuating the outboard device 202 independent of the inboard device 200, and/or actuating the inboard and outboard devices 200, 202 in unison. In an embodiment, the method may include preventing rotation of the inboard shaft 351, the outboard shaft 352, or the motor shaft 306, while driving another one of the inboard shaft 351, the outboard shaft 352, or the motor shaft 306 to rotate a remaining one of the inboard shaft 351, the outboard shaft 352, or the motor shaft 306, as described above.

Figure 20:
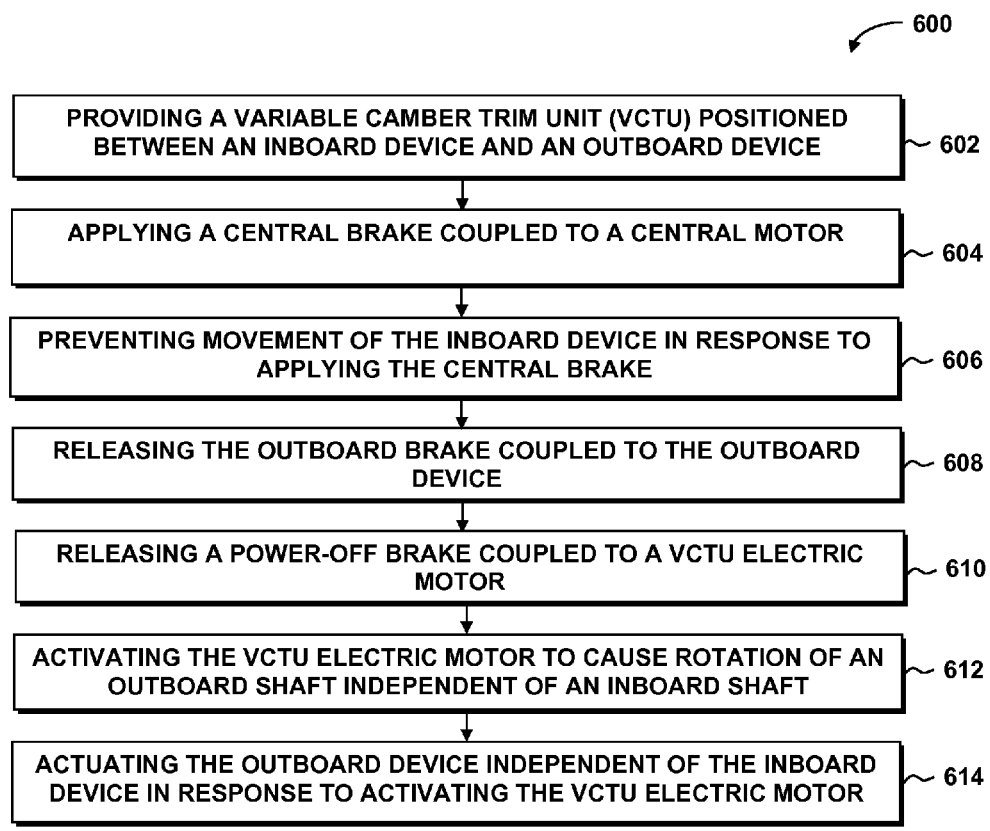
FIG. 20 is a flowchart illustrating one or more operations that may be included in a method of actuating an outboard device independent of an inboard device using the variable camber system disclosed herein.

Referring to FIG. 20, shown is a flowchart of an embodiment of a method 600 of actuating an outboard device 202 independent of an inboard device 200 using the variable camber system 300 disclosed herein. Step 602 of the method 600 of FIG. 20 may include providing a VCTU 302 positioned between an inboard device 200 and an outboard device 202 of an aircraft 100 wing 116 schematically shown in FIG. 6. As indicated above, the inboard device 200 may be drivingly coupled to a central motor 406 of a PDU 400 (FIG. 10) as shown in FIG. 10A. Step 604 of the method 600 may include applying the central brake 414 that may be coupled to the central motor 406 of a centrally located PDU, and Step 606 may include preventing movement of the inboard device 200 in response to applying the central brake 414.

Step 608 of the method 600 of FIG. 20 may include releasing the outboard brake 354 (FIG. 11) coupled to the outboard device, and in Step 610, releasing the power-off brake 310 (FIG. 11) coupled to the VCTU electric motor 304. Step 612 of the method 600 may include activating the VCTU electric motor 304 to cause rotation of the outboard shaft 352 independent of the inboard shaft 351. Step 614 of the method may include actuating the outboard device 202 independent of the inboard device 200 in response to activating the VCTU electric motor 304, as is schematically shown in FIG. 9.

Figure 21:
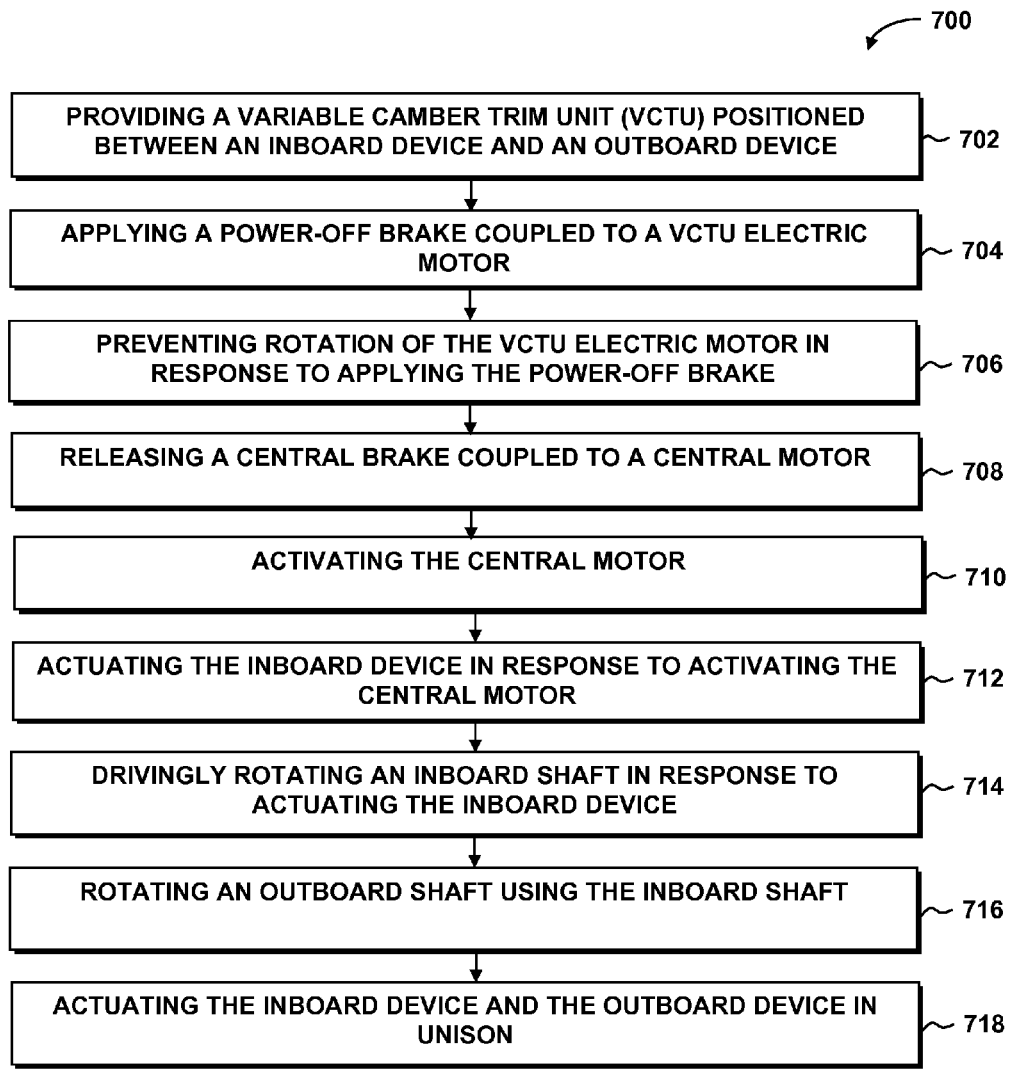
FIG. 21 is a flowchart illustrating one or more operations that may be included in a method of actuating an outboard device in unison with an inboard device using the variable camber system disclosed herein.

Referring to FIG. 21, shown is a flowchart of an embodiment of a method 700 of actuating an outboard device 202 in unison with an inboard device 200 using the variable camber system 300 disclosed herein. Step 702 of the method 700 of FIG. 21 may include providing the VCTU 302 between an inboard device 200 and an outboard device 202 as shown in FIG. 6. Step 704 may include applying the power-off brake 310 (FIG. 11) which is coupled to the VCTU electric motor 304, and in Step 706, preventing rotation of the VCTU electric motor 304 in response to applying the power-off brake 310.

Step 708 of the method 700 of FIG. 21 may include releasing a central brake 414 (FIG. 6) coupled to the central motor 406 of a PDU 400 shown in FIG. 10. Step 710 may include activating the central motor 406, and in Step 712, actuating the inboard device 200 in response to activating the central motor 406. Step 714 may include drivingly rotating the inboard shaft 351 in response to actuating the inboard device, and in Step 716, rotating the outboard shaft 352 using the inboard shaft 351. Step 718 may include actuating the inboard device 200 and the outboard device 202 in unison, as is schematically shown in FIG. 7.

Figure 22:
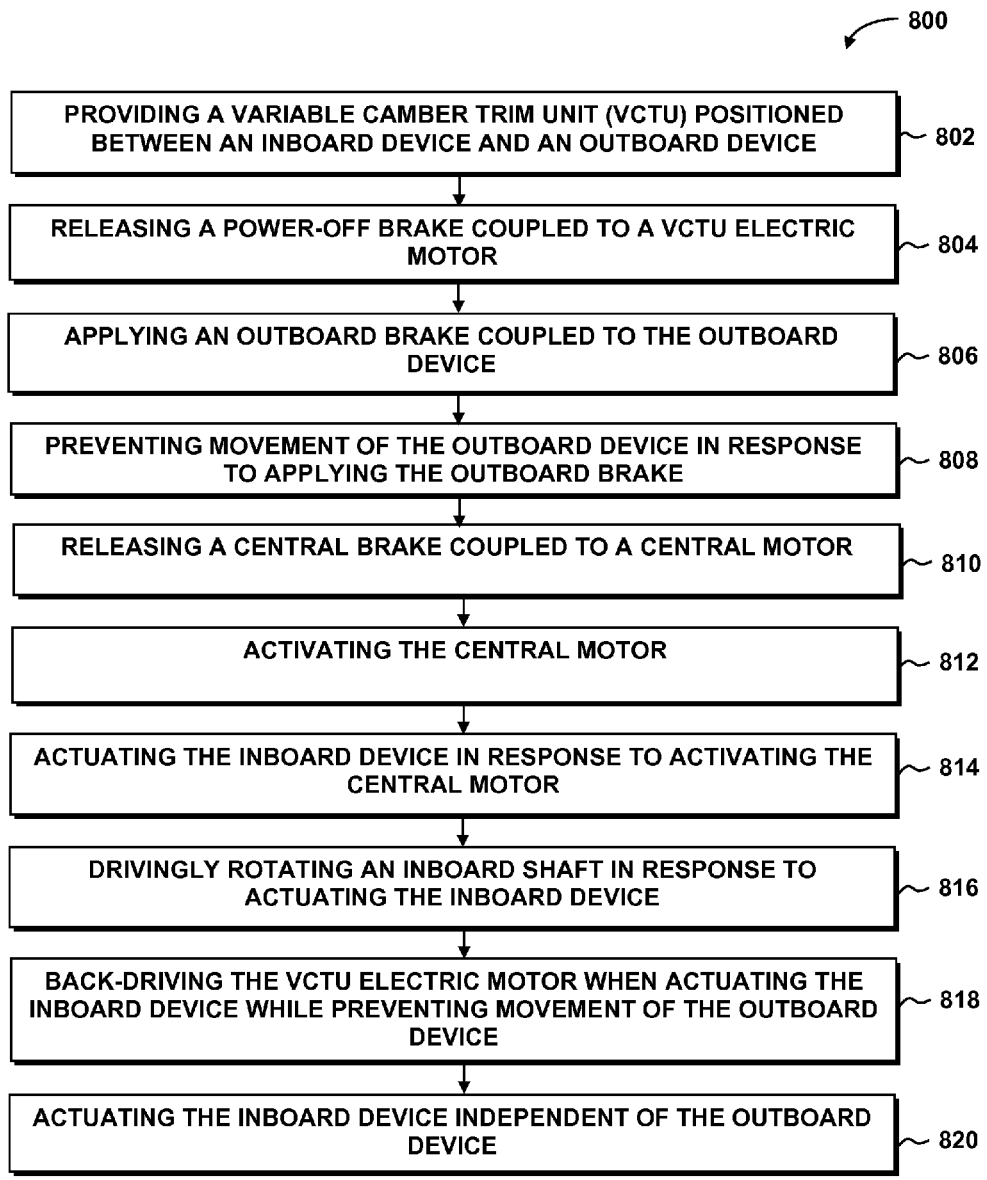
FIG. 22 is a flowchart illustrating one or more operations that may be included in a method of actuating an inboard device independent of an outboard device using the variable camber system disclosed herein.

Referring to FIG. 22, shown is a flowchart of an embodiment of a method 800 of actuating an inboard device 200 independent of an outboard device 202 using the variable camber system 300 disclosed herein. Step 802 of the method 800 of FIG. 22 may include providing the VCTU 302 between the inboard device 200 and the outboard device 202 as shown in FIG. 6. Step 804 may include releasing the power-off brake 310 (FIG. 11) coupled to the VCTU electric motor 304. Step 806 may include applying the outboard brake 354 (FIG. 11) coupled to the outboard device, and in Step 808, preventing movement of the outboard device 202 in response to applying the outboard brake 354. Step 810 may include releasing the central brake 414 coupled to the central motor 406.

Step 812 may include activating the central motor 406 of the PDU 400 (FIG. 10), and in Step 814, actuating the inboard device 200 in response to activating the central motor 406 shown in FIG. 10A. Step 816 may include drivingly rotating the inboard shaft 351 in response to actuating the inboard device 200. Step 818 may include back-driving the VCTU electric motor 304 in response to actuating the inboard device, and in Step 820, actuating the inboard device 200 independent of the outboard device 202.

Advantageously, in the event of a failure of a VCTU electric motor 304, the variable camber system 300 may still actuate the inboard and outboard devices 200, 202 by selectively operating the power-off brake 310 and the outboard brake 354 while driving the inboard and outboard devices 200, 202 with the central motor 406. For example, to deploy the outboard device 202 to a greater deflection angle than the inboard device 200 without using the VCTU electric motor 304, the power-off brake 310 may initially be applied and the central motor 406 may drive the inboard and outboard devices 200, 202 until the outboard device 202 reaches the target variable camber position. The outboard brake 354 may then be applied to lock the outboard device 202 in position, and the power-off brake 310 may be released while the central motor 406 retracts the inboard device, during which time the central motor 406 will back-drive the VCTU electric motor 304.

In an embodiment, the variable camber system 300 may be operated by initially calculating a new reference position for the inboard devices 200 and outboard devices 202, with limits applied to the reference positions to avoid exceeding predetermined travel limits and to avoid exceeding maximum allowable inboard-outboard splits 356 (FIG. 8-9) between the inboard and outboard devices 200, 202. The variable camber system 300 may adjust the position of the inboard devices 200 and the outboard devices 202 by a minimum step which may be stored as a constant in the flight control electronics 422. As indicated earlier, the flight control electronics 422 receives position signals representative of the current positions of the inboard and outboard devices 200, 202, and compares the current position of the inboard and outboard devices 200, 202 to the corresponding new reference position of the inboard and outboard devices 200, 202. If the difference between the current position and the new reference position is less than a percentage of the minimum step (e.g., within approximately 70 percent), the inboard and outboard devices 200, 202 are considered to be in position and are therefore not moved.

If the difference between the current position and the desired reference position is greater than the percentage of the minimum step, then the flight control electronics 422 determines the require position change of the inboard and/or outboard device 200, 202. If the position change results in the inboard and/or outboard device 200, 202 exceeding the predetermined travel limit, then the variable camber system 300 initially moves the inboard and/or outboard device 200, 202 away from the new reference position by the minimum step to create separation, after which the variable camber system 300 moves the inboard and/or outboard device 200, 202 back toward the new reference position.

In an embodiment, the variable camber system 300 may be configured such that if both of the inboard and outboard devices 200, 202 are out of position (i.e., the difference between the current position and the desired reference position is greater than the percentage of the minimum step), then the variable camber system 300 may initially position the inboard devices 200 prior to positioning the outboard devices 202. In the event that the positioning of the inboard devices 200 would move the inboard devices 200 away from the outboard device 202 by an amount exceeding the maximum inboard-outboard split, then the outboard devices 202 may be positioned prior to positioning the inboard devices 200.

Position commands for the variable camber system 300 may be determined by applying the required position changes to the inboard devices 200 or to the left and right outboard devices 202, depending upon the whether the devices 200, 202 are determined to be in position, and according to a predetermined inboard-outboard sequencing logic. If the variable camber system 300 is in the process of repositioning the inboard and/or outboard devices 200, 202, the position commands are held. After the movement of the inboard and outboard devices 200, 202 ceases, position commands may be compared to the current positions of the inboard and/outboard devices 200, 202 to produce a set of extend and retract requests for the inboard devices 200, left outboard devices 202, and right outboard devices 202. The VCTU 302 motor logic may use the extend and retract requests to generate commands for brake release, extend, and retract commands for the motor controllers 303 of the VCTU electric motors 304 of the inboard device 200, the left outboard devices 202, and the right outboard devices 202. As indicated above, the VCTU electric motors 304 may be controlled by the motor controllers 303 which may be substantially continuously provided with generally low-voltage power, except that high-voltage power may be provided to activate the VCTU electric motors 304.

The variable camber system 300 may be configured to limit the frequency of repositioning movements. For example, the variable camber system 300 may be limited to repositioning the inboard and/or outboard devices 200, 202 at a frequency of no greater than every five (5) minutes. In this regard, the variable camber system 300 may reposition the inboard and/or outboard devices 200, 202 at a maximum of once approximately every five (5) minutes, although the variable camber system 300 may be configured to allow for repositioning of the devices 200, 202 at a frequency greater than once every five minutes (e.g., repositioning may be allowed once every three minutes).

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A variable camber system for an aircraft, comprising:
   a variable camber trim unit (VCTU) positioned between an inboard device and an outboard device mounted to at least one of a leading edge and a trailing edge of a wing, and including:

a speed sum gearbox including:
a sun gear coupled to an inboard shaft and surrounded by a plurality of planet gears, the planet gear supported on a carrier coupled to an outboard shaft, the planet gears engaged to an internal side of a ring gear, an external side of the ring gear engaged to a motor shaft, the inboard shaft coupled to the inboard device, the outboard shaft coupled to the outboard device, the speed sum gearbox configured such that if one of the inboard shaft, the outboard shaft, and the motor shaft is held stationary and prevented from rotating, the remaining pair of shafts rotate under the driving force of one of the remaining shafts of the pair;
a VCTU electric motor engaged via the motor shaft to the speed sum gearbox and being selectively operable in conjunction with the speed sum gearbox to rotate the outboard shaft independent of the inboard shaft in a manner causing the outboard device to be actuated independent of the inboard device;
a central motor coupled to the inboard device; and
the speed sum gearbox is configured such that when the outboard device is stationary and the central motor drives the inboard device, the VCTU electric motor is back-driven.

2. The variable camber system of claim 1, further comprising:
a power-off brake coupled to the VCTU electric motor; and
the speed sum gearbox being configured such that when the power-off brake is applied, the outboard shaft is driven by the inboard shaft causing the inboard device and the outboard device to be actuated in unison.

3. The variable camber system of claim 2, wherein:
the central motor is coupled to a central brake preventing movement of the inboard device when the central brake is applied.

4. The variable camber system of claim 1, further comprising:
an outboard brake included with the VCTU and configured to prevent movement of the outboard device when the outboard brake is applied; and
the speed sum gearbox being configured such that when the outboard brake is applied, the outboard device is stationary and the inboard device is independently driven by the central motor.

5. The variable camber system of claim 1, wherein at least one of the inboard device and the outboard device comprises at least one of the following:
a leading edge device configured as one of a leading edge slat and a Krueger flap; and
a trailing edge device configured as a trailing edge flap.

6. The variable camber system of claim 1, wherein:
the inboard device is coupled to the inboard shaft by an inboard torque tube; and
the outboard device being coupled to the outboard shaft by an outboard torque tube.

7. An aircraft, comprising:
a wing having a leading edge and a trailing edge;
an inboard device and an outboard device mounted to at least one of the leading edge and the trailing edge;
a variable camber trim unit (VCTU) positioned between the inboard device and the outboard device, and including:
a speed sum gearbox including:
a sun gear coupled to an inboard shaft and surrounded by a plurality of planet gears, the planet gear supported on a carrier coupled to an outboard shaft, the planet gears engaged to an internal side of a ring gear, an external side of the ring gear engaged to a motor shaft, the inboard shaft coupled to the inboard device, the outboard shaft coupled to the outboard device, the speed sum gearbox configured such that if one of the inboard shaft, the outboard shaft, and the motor shaft is held stationary and prevented from rotating, the remaining pair of shafts rotate under the driving force of one of the remaining shafts of the pair;
a VCTU electric motor engaged via the motor shaft to the speed sum gearbox and being selectively operable in conjunction with the speed sum gearbox to rotate the outboard shaft independent of the inboard shaft in a manner causing the outboard device to be actuated independent of the inboard device;
a central motor coupled to the inboard device; and
the speed sum gearbox is configured such that when the outboard device is stationary and the central motor drives the inboard device, the VCTU electric motor is back-driven.

8. A method of actuating high-lift devices of an aircraft wing, comprising:
operating a variable camber system to actuate an inboard device, an outboard device, or both, wherein the inboard device and the outboard device are mounted to at least one of a leading edge and a trailing edge of a wing, wherein the variable camber system includes a variable camber trim unit (VCTU) positioned between the inboard device and the outboard device, the VCTU including a speed sum gearbox having a sun gear coupled to an inboard shaft and surrounded by a plurality of planet gears, the planet gear supported on a carrier coupled to an outboard shaft, the planet gears engaged to an internal side of a ring gear, an external side of the ring gear engaged to a motor shaft, the inboard shaft coupled to the inboard device, the outboard shaft coupled to the outboard device, the VCTU including a VCTU electric motor engaged via the motor shaft to the speed sum gearbox, the inboard device drivingly coupled to a central motor having a central brake and the outboard device drivingly coupled to the VCTU; and
preventing rotation of one of the inboard shaft, the outboard shaft, and the motor shaft while rotating a remaining pair of shafts under the driving force of one of the remaining shafts of the pair; and
wherein the operating the variable camber system includes at least one of actuating, the inboard device independent of the outboard device, actuating the outboard device independent of the inboard device, and actuating the inboard and outboard devices in unison.

9. The method of claim 8, further comprising applying the outboard brake to prevent rotation of an outboard torque tube coupled to the outboard device.

10. The method of claim 8, wherein the operating of the variable camber system includes actuating the outboard device independent of the inboard device by driving an outboard torque tube coupled to the outboard device using the VCTU electric motor while preventing movement of the inboard device.

11. The method of claim 10, further comprising applying the central brake to prevent rotation of an inboard torque tube coupled to the inboard device.

12. The method of claim 8, wherein the operating of the variable camber system includes actuating the inboard and outboard devices in unison by driving inboard and outboard torque tubes using the central motor, the inboard and outboard torque tubes coupled to the inboard and outboard devices, respectively.

13. The method of claim 12, further comprising applying the power-off brake to prevent rotation of the VCTU electric motor.

14. The method of claim 8, wherein at least one of the inboard device and the outboard device comprises at least one of the following:
- a leading edge device configured as at least one of a leading edge slat and a Krueger flap; and
- a trailing edge device configured as a trailing edge flap.

15. The method of claim 8, further comprising:
- differentially deploying the inboard device and the outboard device; and
- varying a wing camber along a spanwise direction in response to differentially deploying the inboard device and the outboard device.

* * * * *